(12) United States Patent
Kataoka et al.

(10) Patent No.: US 10,360,183 B2
(45) Date of Patent: Jul. 23, 2019

(54) ENCODING DEVICE, ENCODING METHOD, DECODING DEVICE, DECODING METHOD, AND COMPUTER-READABLE RECORDING MEDIUM

(71) Applicant: FUJITSU LIMITED, Kawasaki-shi, Kanagawa (JP)

(72) Inventors: Masahiro Kataoka, Kamakura (JP); Yasuhiro Suzuki, Yokohama (JP); Kosuke Tao, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 312 days.

(21) Appl. No.: 15/287,431

(22) Filed: Oct. 6, 2016

(65) Prior Publication Data

US 2017/0103085 A1 Apr. 13, 2017

(30) Foreign Application Priority Data

Oct. 9, 2015 (JP) .................................. 2015-201565

(51) Int. Cl.
| | |
|---|---|
| G06F 16/174 | (2019.01) |
| G06F 16/13 | (2019.01) |
| G09C 1/00 | (2006.01) |
| H03M 7/30 | (2006.01) |

(52) U.S. Cl.
CPC .......... *G06F 16/1744* (2019.01); *G06F 16/13* (2019.01); *G09C 1/00* (2013.01); *H03M 7/30* (2013.01); *H03M 7/3088* (2013.01); *H03M 7/6005* (2013.01); *H03M 7/6017* (2013.01); *H04L 2209/30* (2013.01)

(58) Field of Classification Search
CPC ................................................. G06F 17/30153
See application file for complete search history.

(56) References Cited

U.S. PATENT DOCUMENTS

| | | | |
|---|---|---|---|
| 9,378,126 B2 * | 6/2016 | Kataoka | H03M 7/4031 |
| 2008/0098024 A1 | 4/2008 | Kataoka et al. | |
| 2009/0307249 A1 | 12/2009 | Koifman et al. | |

(Continued)

FOREIGN PATENT DOCUMENTS

| | | |
|---|---|---|
| JP | 9-69113 | 3/1997 |
| JP | 11-85790 | 3/1999 |

(Continued)

OTHER PUBLICATIONS

Ferragina, Paolo, et al. "Compressed text indexes: From theory to practice." Journal of Experimental Algorithmics (JEA)13 (2009): 12. (Year: 2009).*

(Continued)

Primary Examiner — William Spieler
(74) Attorney, Agent, or Firm — Xsensus LLP

(57) ABSTRACT

A non-transitory computer-readable recording medium stores therein an encoding program that causes a computer to execute a process including: first creating a plurality of pieces of encoded data that are obtained by encoding a plurality of files by using a specific encoding format; second creating a plurality of encoded blocks that are obtained by dividing combined encoded data, the combined encoded data being obtained by combining the plurality of pieces of the encoded data into blocks with a fixed length; and third creating an index associated with each of the plurality of the encoded blocks.

11 Claims, 15 Drawing Sheets

(56) References Cited

U.S. PATENT DOCUMENTS

| | | | |
|---|---|---|---|
| 2010/0169274 A1 | 7/2010 | Kulkarni et al. | |
| 2013/0238865 A1* | 9/2013 | Kataoka | G06F 12/00 |
| | | | 711/154 |
| 2015/0032705 A1 | 1/2015 | Ideuchi et al. | |
| 2016/0224520 A1* | 8/2016 | Kataoka | G06F 17/2276 |

FOREIGN PATENT DOCUMENTS

| | | |
|---|---|---|
| JP | 2010-508606 A | 3/2010 |
| JP | 2011-114546 | 6/2011 |
| JP | 2013-101672 A | 5/2013 |
| JP | 2015-026350 A | 2/2015 |
| WO | 2006/123429 A1 | 11/2006 |

OTHER PUBLICATIONS

Japanese Office Action dated May 21, 2019, issued in corresponding Japanese Patent Application No. 2015-201565.

* cited by examiner

ENCODING DEVICE, ENCODING METHOD, DECODING DEVICE, DECODING METHOD, AND COMPUTER-READABLE RECORDING MEDIUM

CROSS-REFERENCE TO RELATED APPLICATION

This application is based upon and claims the benefit of priority of the prior Japanese Patent Application No. 2015-201565, filed on Oct. 9, 2015, the entire contents of which are incorporated herein by reference.

FIELD

The embodiments discussed herein are related to an encoding device or the like.

BACKGROUND

In compression techniques, an LZ77 system, such as ZIP or the like, that performs a longest match character string search by using a sliding window is the mainstream. When an information processing apparatus compresses multiple files by using ZIP and combines the compressed files, the files are individually compressed by using parameters associated with the corresponding files. Consequently, when searching the file, which is obtained by compressing and combining the multiple files, for a character string, the information processing apparatus releases the combination, decompresses the individual files, and then performs a check. The index that is used to speed up a search of a character string is created, in units of files, in a step different from a compression step. Regarding the index, for example, a pointer type inverted index is known in which an address for each word included in text data is indexed for each file.

There is a known technology that divides a compression target file (data to be compressed) into multiple blocks, performs a compression process on each block, and creates compressed data. In this technology, a dictionary that is needed when encoding data stored in a block targeted for compression from among the multiple divided blocks is created based on the data that is to be compressed and that is stored in the divided block (for example, see Japanese Laid-open Patent Publication No. 2011-114546).

However, there is a problem in that, when searching the file, which is obtained by compressing and combining the multiple files, for a character string, it is unable to perform a high-speed search. Namely, with the related technology, when searching the file, which is obtained by compressing and combining the multiple files, for a character string, the combination is released, all of the individual files are decompressed from the top, and then decompressed character strings are checked against a search character string; therefore, it is unable to perform a high-speed search. Even if a search is performed by using the index, because the decompressed character string is checked against a search character string in units of files by using the index that is created in units of individual files, it is unable to perform a high-speed search.

SUMMARY

According to an aspect of the embodiments, a non-transitory computer-readable recording medium stores therein an encoding program that causes a computer to execute a process including: first creating a plurality of pieces of encoded data that are obtained by encoding a plurality of files by using a specific encoding format; second creating a plurality of encoded blocks that are obtained by dividing combined encoded data, the combined encoded data being obtained by combining the plurality of pieces of the encoded data into blocks with a fixed length; and third creating an index associated with each of the plurality of the encoded blocks.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. In the embodiment, encoding is described as compression; however, encoding is not limited to this and encoding may also be encoding that is different from the compression. Furthermore, the present invention is not limited to the embodiment.

Figure 1:
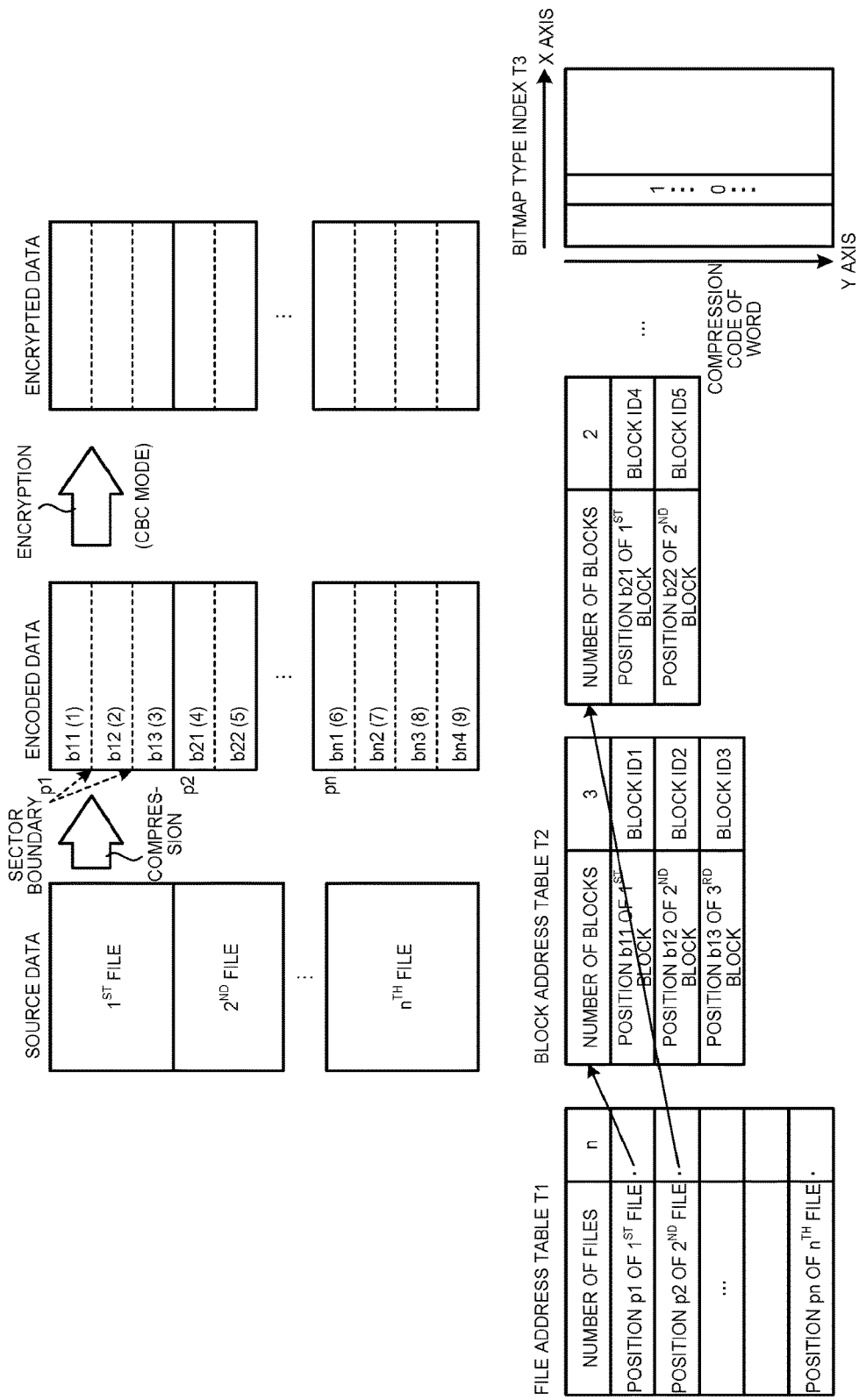
FIG. 1 is a schematic diagram illustrating an example of an encoding process according to an embodiment.

FIG. 1 is a schematic diagram illustrating an example of an encoding process according to an embodiment. As illustrated in FIG. 1, an information processing apparatus sequentially performs compression encoding on data in a source file, which is obtained by combining a plurality of files, for each file by using a specific encoding format. Namely, the information processing apparatus performs compression encoding on the plurality of the files by using an encoding dictionary that is a common parameter.

The encoding dictionary is, for example, a static dictionary and a dynamic dictionary. The static dictionary is a dictionary in which the frequency of appearance of words appearing in a document is specified based on general English dictionaries, Japanese dictionaries, schoolbooks, or the like and in which codes with a smaller length are allocated to the words with a higher frequency of appearance. In contrast, the dynamic dictionary is a dictionary in which a word that is not registered in the static dictionary is associated with a dynamic code that is dynamically attached. The word that is not registered in the static dictionary is, for example, a word with a low frequency of appearance (low frequency word), a value, a time, a tag, or the like. In the dynamic dictionary, words associated with the dynamic codes are registered in the order of appearance of words that are not registered in the static dictionary.

Then, the information processing apparatus divides the encoded data, which is obtained by combining data subjected to compression encoding, into a plurality of blocks. The block has a fixed length and the length of the block is, for example, 2 KB. The block may also be a single sector or the assembly of multiple sectors. In the embodiment, it is assumed that 1 block/1 sector is used.

For example, the information processing apparatus sequentially reads each of the files from the source file and sequentially extracts each of the words from the top of the read file. The information processing apparatus performs compression encoding on the extracted words and stores the obtained compression codes in blocks with a fixed length. The information processing apparatus stores the compression codes in the blocks with the fixed length by using the number of compression codes or a padding such that each of the compression codes is not to be decoupled between the blocks. The number of compression codes is the number of compression codes stored in a block. The padding indicates complement of a portion that is insufficient for a block length and complements the portion by using, for example, multiple zeros in units of bits.

Then, the information processing apparatus creates, in parallel with compression encoding, a file address table T1 and a block address table T2 that indicates information related to compression encoding of each of the plurality of the files. The file address table T1 stores therein, in an associated manner, the position of each of the files in the encoded data when each of the files in the source data is subjected to compression encoding and a pointer to the block address table T2. As an example, the position of each of the files in the encoded data is the relative position in the encoded data. The block address table T2 stores therein, in an associated manner, the position of each of the blocks in the encoded data and the ID (block ID) that is used to uniquely identify a block. The position of each of the blocks in the encoded data is the relative position in the encoded data. The block IDs are, for example, natural numbers starting from 1 in ascending order.

Here, the source data includes therein a first file, a second file, . . . , and an $n^{th}$ file. The file address table T1 stores therein, in an associated manner, a position p1 in the encoded data in the first file is and the pointer to the block address table T2. The block address table T2 indicated by the pointer to the block address table T2 stores therein "3" as the number of blocks. As the position of the first block, "b11" is stored and, as the block ID indicated by the first block, "1" is stored. As the position of the second block, "b12" is stored and, as the block ID indicated by the second block, "2" is stored. As the position of the third block, "b13" is stored and, as the block ID indicated by the third block, "3" is stored. Furthermore, the block with the block ID of "4" corresponds to the first block of the second file that is subsequent to the first file.

Furthermore, the information processing apparatus creates, in parallel with compression encoding, a bitmap type index T3 that is associated with each of the plurality of the divided blocks. The bitmap type index T3 indicates a bitmap obtained by indexing the presence or absence of each word in each block. The X axis in the bitmap type index T3 represents the block ID and the Y axis in the bitmap type index T3 represents a compression code of a word. Namely, the bitmap type index T3 indicates, by using a bit value for each of the blocks indicated by the associated block IDs, whether each of the words is present. For example, a certain word is present in a block, the value of the binary bit of "1" is set as the presence or absence of the subject word in the block. If a certain word is not present in a block, the value of the binary bit of "0" is set as the presence or absence of the subject word in the block. Furthermore, an example has been described in which the information processing apparatus creates the bitmap type index T3 in parallel with compression encoding; however, the embodiment is not limited to this. After having ended the compression encoding, by using the file address table T1 and the block address table T2 that indicate the information related to the compression encoding of each of the plurality of the files, the information processing apparatus may also create the bitmap type index T3 that is associated with each of the plurality of the blocks. The bitmap type index T3 will be described in detail later.

The information processing apparatus encrypts, for each fixed block, the information included in each block. For example, encryption is performed for each block by using AES in the CBC mode. The encryption using the CBC mode is performed by the EOR operation between the block targeted for the encryption and the block previous to the block targeted for the encryption. The encryption is not limited to the CBC mode and any mode may also be used as long as a mode that performs encryption for each block and that can perform partial decompression.

Example of a Bitmap Type Index

Figure 2:
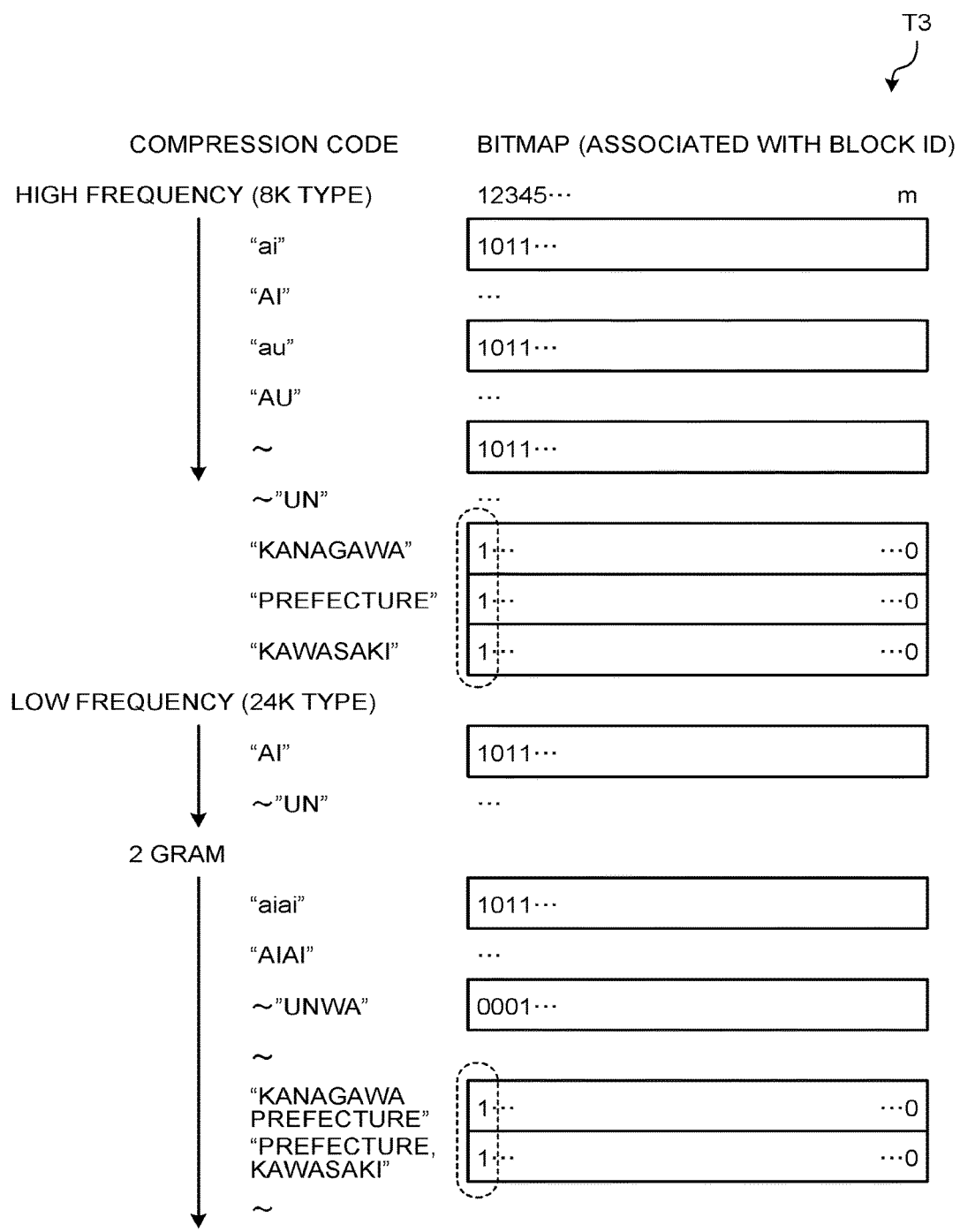
FIG. 2 is a schematic diagram illustrating an example of a bitmap type index according to the embodiment.

In the following, an example of a bitmap type index according to the embodiment will be described with reference to FIG. 2. FIG. 2 is a schematic diagram illustrating an example of a bitmap type index according to the embodiment. As illustrated in FIG. 2, the bitmap type index T3 associates a bitmap with each of the compression codes of a high frequency word, a low frequency word, and a 2-gram word (or a letter). The bitmap is a code bit string indicating which of the blocks includes therein one of the compression code of the high frequency word, the compression code of the low frequency word, and the compression code of the 2-gram word. Each of the bits in the bitmap indicates whether the compression code of the high frequency word, the compression code of the low frequency word, and the compression code of the 2-gram word are included in each of the blocks. Furthermore, various kinds of words or N-gram word (or a letter) including 2 grams is an example of an element.

The bitmap type index T3 associates the bitmap for, for example, each of the compression codes of 8K-type high frequency words, 24K-type low frequency words, and the 2-gram words. The high frequency words are top 8000 words with a high frequency of appearance in a text file group that is used for frequency aggregation. The low frequency words are words that extracted from the source file target for encoding and that are ranked in 8000 or lower regarding the order of the frequency of appearance in the text file group used for frequency aggregation.

For example, in the first line of the valid line in the bitmap type index T3, the bitmap of word "ai" indicated by the compression code is "1011 . . . ". The bitmap in the first line of the valid line in the bitmap type index T3 indicates the block in which the compression code of "ai" is included. The bitmap "1011 . . . " indicates that, because "1" is stored in the $1^{st}$ bit, "ai" is included in a block 1; because "0" is stored in the $2^{nd}$ bit, "ai" is not included in a block 2; and, because "1" is included in the $3^{rd}$ bit, "ai" is included in a block 3. Furthermore, the bitmap "1011 . . . " indicates that, because "1" is included in the $4^{th}$ bit, "ai" is included in a block 4. Furthermore, the bitmap "1011 . . . " also indicates whether "ai" is included in each of a block 5 and the subsequent blocks.

By using the bitmap type index T3, it is possible to narrow down, at a high speed, which of the blocks stores therein the compression code of the word that forms an input character string. For example, if the input character string is "Kanagawa Prefecture, Kawasaki", it is possible to narrow down, at a high speed, each of the compression codes of the words of "Kanagawa", "prefecture", and "Kawasaki" that form "Kanagawa Prefecture, Kawasaki" is present in the "block 1".

Figure 3:
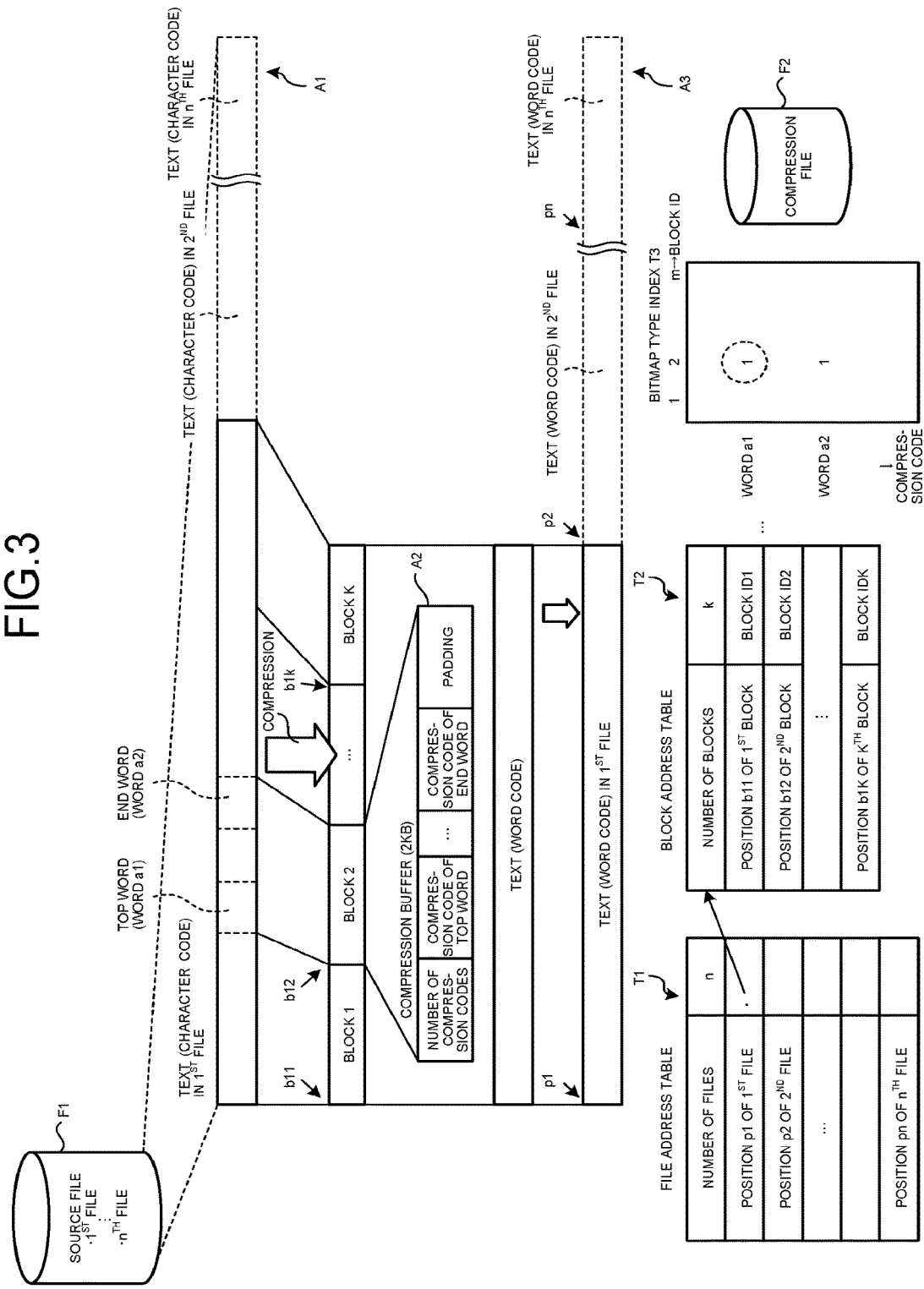
FIG. 3 is a schematic diagram illustrating an example of the flow of the encoding process according to the embodiment.

FIG. 3 is a schematic diagram illustrating an example of the flow of the encoding process according to the embodiment. In FIG. 3, a description will be given of a process in which the information processing apparatus divides the encoded data into a plurality of blocks and creates the bitmap type index T3 associated with each of the plurality of the divided blocks. The information processing apparatus provides, as a work area of the compression encoding process, a storage area A1, a storage area A2, and a storage area A3 in a memory.

The storage area A1 is a storage area in which the data size is defined in accordance with the size of the source file F1. The storage area A1 is the storage area with, for example, 64 kilo bytes. The storage area A2 is a compression buffer and has the length of the block length. The storage area A3 is the storage area that stores therein the compressed data that is stored in the compression file F2.

The information processing apparatus reads a first file into the storage area A1. The information processing apparatus sequentially performs compression encoding on the words in the storage area A1 from the top. The compression encoding is performed by a static dictionary or a dynamic dictionary that are common with a plurality of files. The information processing apparatus stores the compression codes in the storage area A2. Here, a description will be given of a case in which the block ID is 2.

The information processing apparatus determines whether a block length exceeds if a compression code is temporarily written in the storage area A2. If a block length does not exceeds if the compression code is temporarily written in the storage area A2, the information processing apparatus writes the compression code in the storage area A2 that functions as the block 2. Then, the information processing apparatus creates the bitmap type index T3 associated with the block 2. For example, it is assumed that the compression code of the top word in the block 2 is the compression code of a word a1. In this case, the information processing apparatus sets "1" to the bit located at the position in which the column that indicates that the block ID is 2 intersects with the row that indicates that the compression code of the word is the compression code of the word a1.

If the block length exceeds when the compression code is temporarily written in the storage area A2, the information processing apparatus does not write the subject compression code in the storage area A2. The information processing apparatus writes, in the top in the storage area A2, the number of compression codes that indicates the number of the compression codes that have already written in the storage area A2. The information processing apparatus complements the storage area A2 by using a padding in units of bits. Then, the information processing apparatus stores, in the storage area A3, the data that is stored in the block 2 stored in the storage area A2. Furthermore, for the compression code that is determined that the block length exceeds when the compression code is written in the storage area A2, the information processing apparatus performs a process on the block 2, writes the compression code in the storage area A2 as the subsequent block 3, and then proceeds to the process performed on the subsequent word.

After the information processing apparatus stores, in the storage area A3, the data that is stored in the block 2, the information processing apparatus adds the position of the block 2 in the storage area A3 to the block address table T2. Here, as the position of the block 2, "b12" is added to the block address table T2 that is associated with the first file. Then, after having processed the word positioned at the end in the first file, the information processing apparatus adds the information related to the first file to the file address table T1. Namely, the information processing apparatus adds, to the file address table T1, the top position in the first file in the storage area A3 and the pointer to the block address table T2 associated with the first file.

In this way, the information processing apparatus continuously performs the encoding process on the first file, the encoding process on the second file, . . . , and the encoding process on the $n^{th}$ file. Consequently, the information processing apparatus can store the encoded data in the storage area A3.

Figure 4:
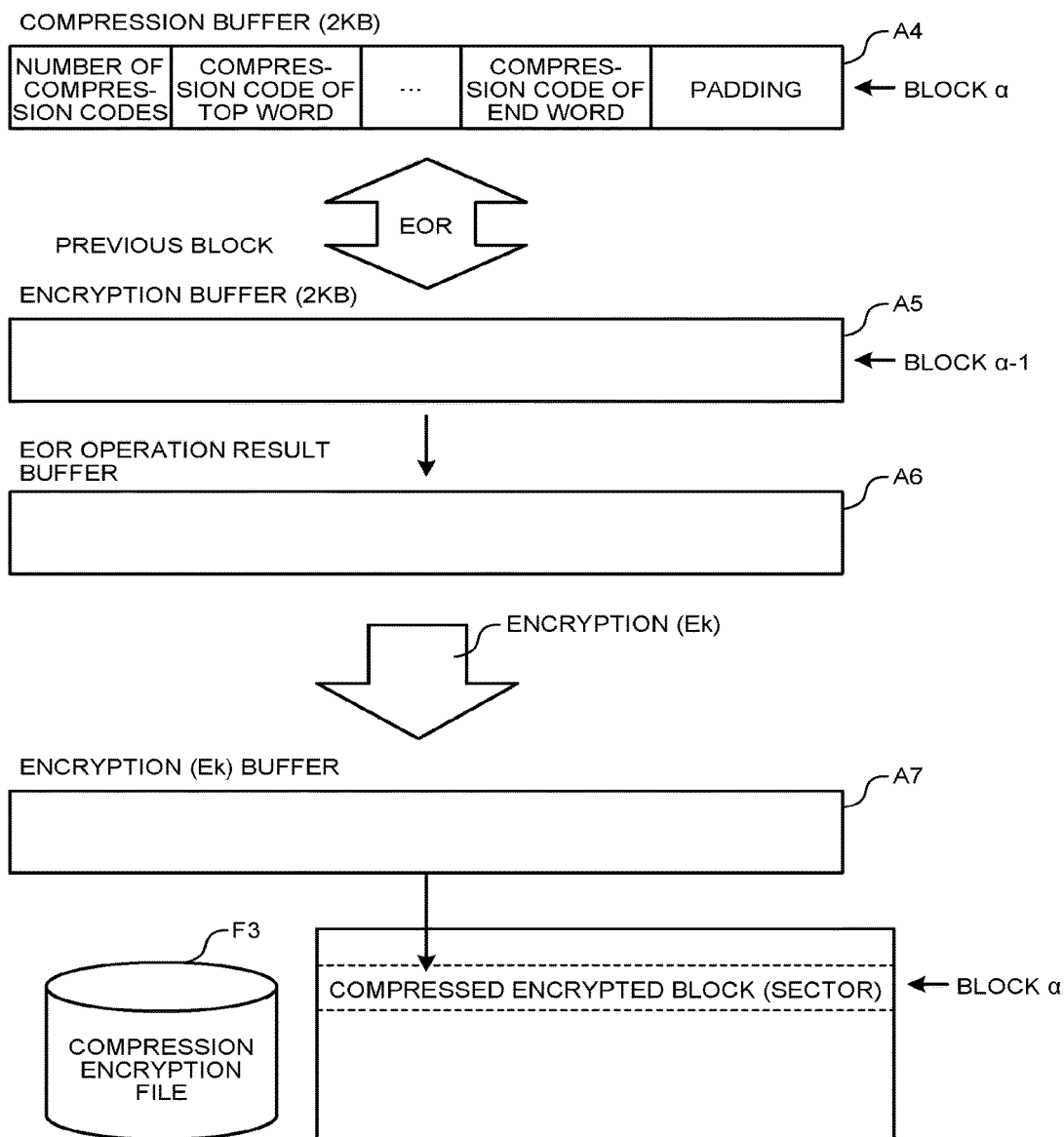
FIG. 4 is a schematic diagram illustrating an example of the flow of a compression encryption process according to the embodiment.

FIG. 4 is a schematic diagram illustrating an example of the flow of a compression encryption process according to the embodiment. In FIG. 4, a description will be given of a process in a case in which the information processing apparatus encrypts a block $\alpha$ with the block ID of $\alpha$. The information processing apparatus provides, as a work area of the compression process, a storage area A4, a storage area A5, a storage area A6, and a storage area A7 in a memory. The storage area A4 is a compression buffer and stores therein data associated with the block $\alpha$. The storage area A5, the storage area A6, and the storage area A7 are used to encrypt the blocks.

The information processing apparatus performs an EOR operation between the data in the block $\alpha$ that is stored in the storage area A4 and that has been subjected to the compression encoding and the data in a block $\alpha$-1 that is stored in the storage area A5 and that has been encrypted and then stores the EOR operation result in the storage area A6. Furthermore, if the block is a first block, an EOR operation between the data in the first block and the initial value IV of an n bit is performed and the EOR operation result is stored in the storage area A6. The storage area A5 is, for example, an encryption buffer. The storage area A6 is an EOR operation result buffer. The information processing apparatus performs an operation of the EOR operation result by using the affine encryption function (Ek), encrypts the block α, and stores the data in the storage area A7. The storage area A7 is an encryption (Ek) buffer. The information processing apparatus stores, in the compression encryption file F3, the data in the compressed encrypted block stored in the storage area A7. Namely, the information processing apparatus encrypts the block α that has been subjected to compression encoding.

Figure 5:
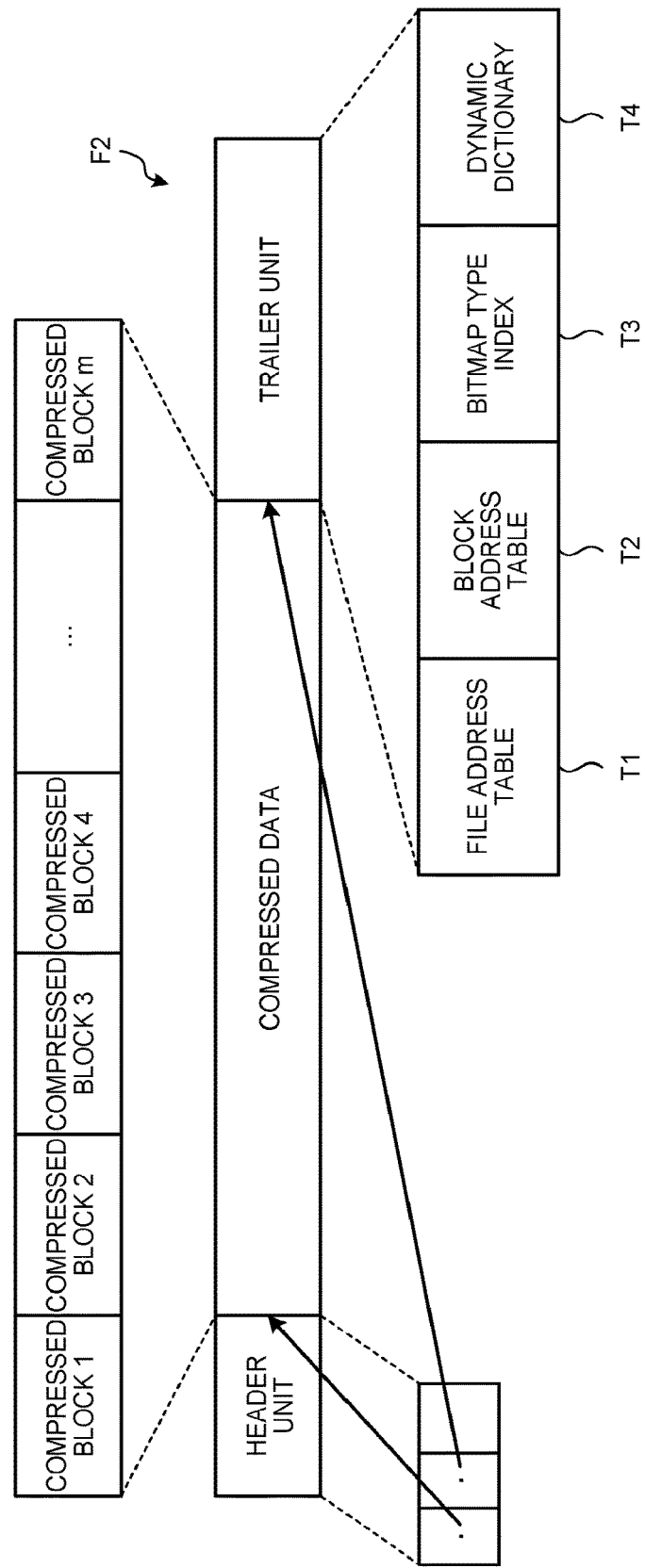
FIG. 5 is a schematic diagram illustrating a configuration example of a compressed file.

FIG. 5 is a schematic diagram illustrating a configuration example of a compressed file. As illustrated in FIG. 5, the compression file F2 includes a header unit, compressed data, and a trailer unit. The trailer unit stores therein information in a file address table T1, a block address table T2, a dynamic dictionary T4, and the bitmap type index T3 that are obtained after the compression process has been completed. The bitmap type index T3 corresponds to the bitmap type index illustrated in FIG. 2. The file address table T1 and the block address table T2 stores therein the information on each of the tables illustrated in FIG. 3. The dynamic dictionary T4 stores therein the dynamic dictionary that is used when compression encoding is performed. In the header unit, a pointer to the compressed data is stored. Furthermore, in the header unit, a pointer to the trailer unit is stored. The pointer to the trailer unit includes therein each of the pointers to the file address table T1, the block address table T2, the dynamic dictionary T4, and the bitmap type index T3 that are stored in the trailer unit. When the information processing apparatus performs partial decoding decompression, which will be described later, by using a pointer that indicates to the trailer unit and that is stored in the header unit, the information processing apparatus can refer to the bitmap type index T3, the file address table T1, and the block address table T2. Furthermore, the file address table T1, the block address table T2, the dynamic dictionary T4, and the bitmap type index T3 are preferably stored from the top in an independent block in the trailer unit. Consequently, because the trailer unit is encrypted in the same manner as the compressed data, the information processing apparatus can perform partial decoding decompression at a high speed by decoding the information in the bitmap type index T3 or the like at the time of partial decoding decompression.

Figure 6:
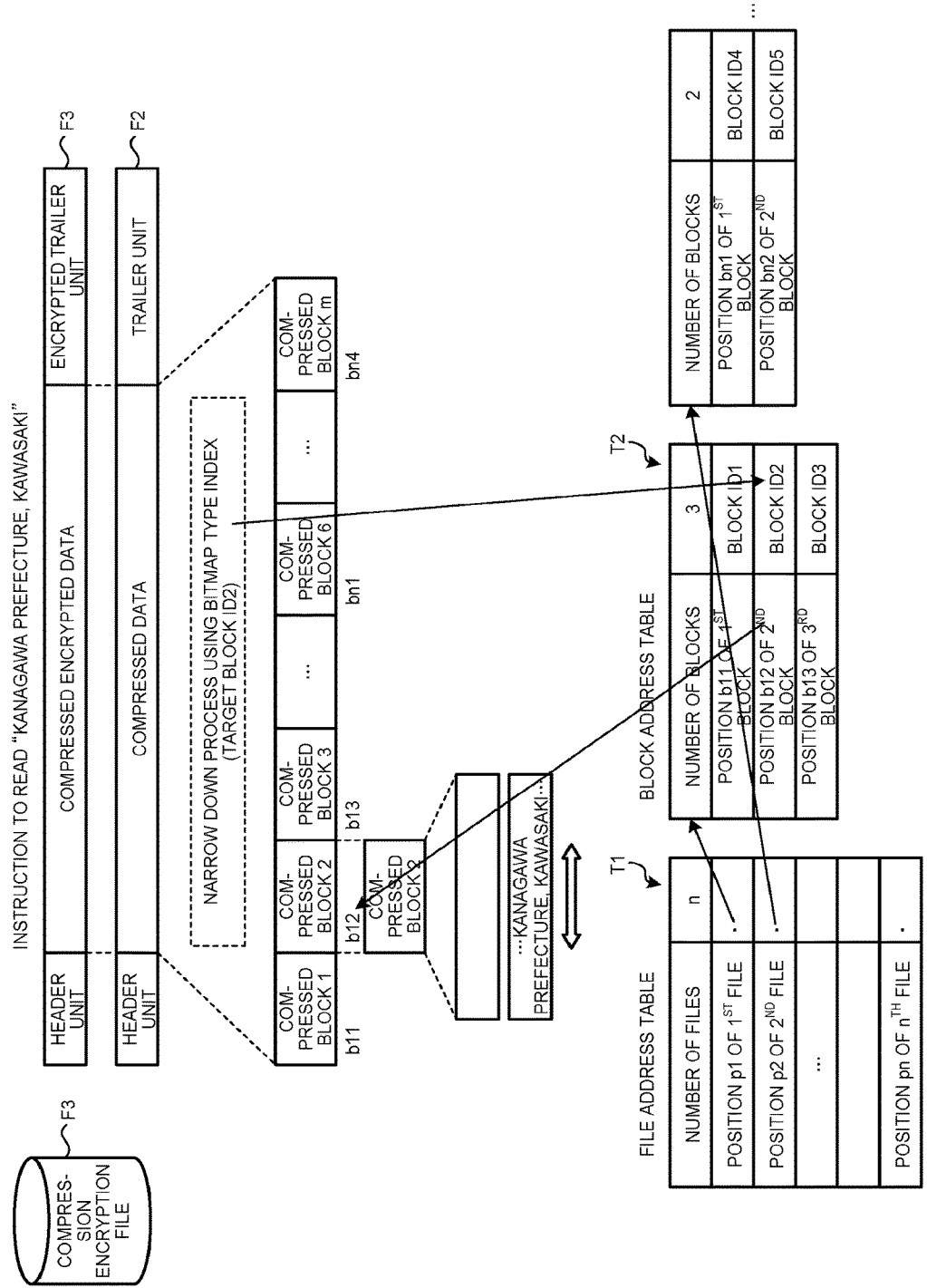
FIG. 6 is a schematic diagram illustrating an example of a partial decoding decompression process according to the embodiment.

FIG. 6 is a schematic diagram illustrating an example of a partial decoding decompression process according to the embodiment. As illustrated in FIG. 6, a description will be given of a partial decoding decompression process performed when the information processing apparatus acquires an instruction to read "Kanagawa Prefecture, Kawasaki". The information processing apparatus decodes the bitmap type index T3 by decoding the block indicated by the pointer, which is stored in the header unit in the compression encryption file F3, to the bitmap type index T3. The information processing apparatus decodes the file address table T1 by decoding the block indicated by the pointer, which is stored in the header unit in the compression encryption file F3, to the file address table T1. The information processing apparatus decodes the block address table T2 by decoding the block indicated by the pointer to the block address table T2 stored in the header unit in the compression encryption file F3. The information processing apparatus decodes the dynamic dictionary by decoding the block indicated by the pointer to the dynamic dictionary stored in the header unit in the compression encryption file F3.

The information processing apparatus narrows down the blocks that are decompression targets by using the bitmap type index T3. The narrow down process performed by using the bitmap type index T3 will be described in detail later. Here, it is assumed that the block ID indicating the narrowed down block is "2". In this case, the information processing apparatus reads the position of the narrowed down block ID from the block address table T2. Here, because the target block ID that has been narrowed down is "2", "b12" is read as the position of the block indicated by the block ID2.

The information processing apparatus reads, from the compression encryption data stored in the compression encryption file F3, the block 2, which is present at the position "b12" of the target block ID that has been narrowed down, and the block that is needed to perform decoding. The information processing apparatus performs a partial decoding process on the block 2. Consequently, the information processing apparatus creates a compressed block 2 that is the block obtained by decoding the block 2. The partial decoding process will be described in detail later.

The information processing apparatus performs a partial decompression process on the compressed block 2 and creates decompression data.

The information processing apparatus checks the created decompression data against "Kanagawa Prefecture, Kawasaki" that is instructed to be read and then outputs matched "Kanagawa Prefecture, Kawasaki". At this time, the information processing apparatus may also output the block ID of the narrowed down target block in combination with the matched "Kanagawa Prefecture, Kawasaki". Furthermore, the information processing apparatus may also output, in combination, the identification number of the file that includes therein the target block. Namely, the information processing apparatus specifies the identification number of the file by using the file address table T1 and the block address table T2 and outputs the information.

Figure 7:
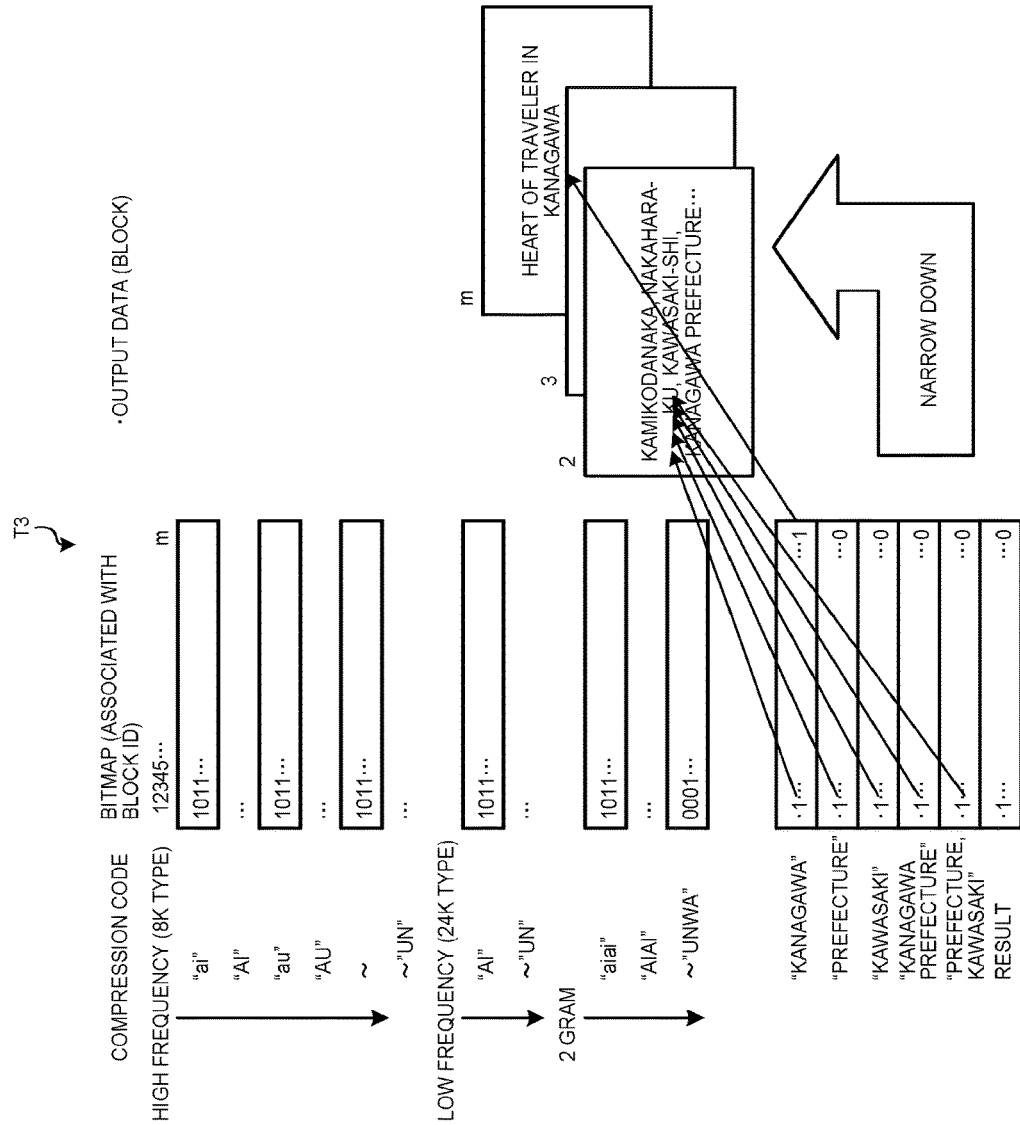
FIG. 7 is a schematic diagram illustrating an example of narrowing down performed by using a bitmap type index.

FIG. 7 is a schematic diagram illustrating an example of narrowing down performed by using a bitmap type index. As illustrated in FIG. 7, a description will be given of a narrow down process by using the bitmap type index T3 when the information processing apparatus acquires an instruction to read "Kanagawa Prefecture, Kawasaki". The information processing apparatus narrows down, by using the bitmap type index T3, the block IDs indicating that all of the bitmaps associated with one of the compression codes of the word "Kanagawa", the word "prefecture", and the word "Kawasaki" that form "Kanagawa Prefecture, Kawasaki" is "1". Here, the information processing apparatus can narrow down the "block 2". Furthermore, the information processing apparatus may also narrow down, by using the bitmap type index T3, the block IDs indicating all of the bitmaps associated with one of the compression codes of the 2-gram words of "Kanagawa prefecture" and "prefecture Kawasaki" forming "Kanagawa Prefecture, Kawasaki" are "1". In this way, by using the bitmap type index T3, the information processing apparatus can narrow down, at a high speed, the blocks in which the compression codes of the words forming the input character string are present.

Figure 8:
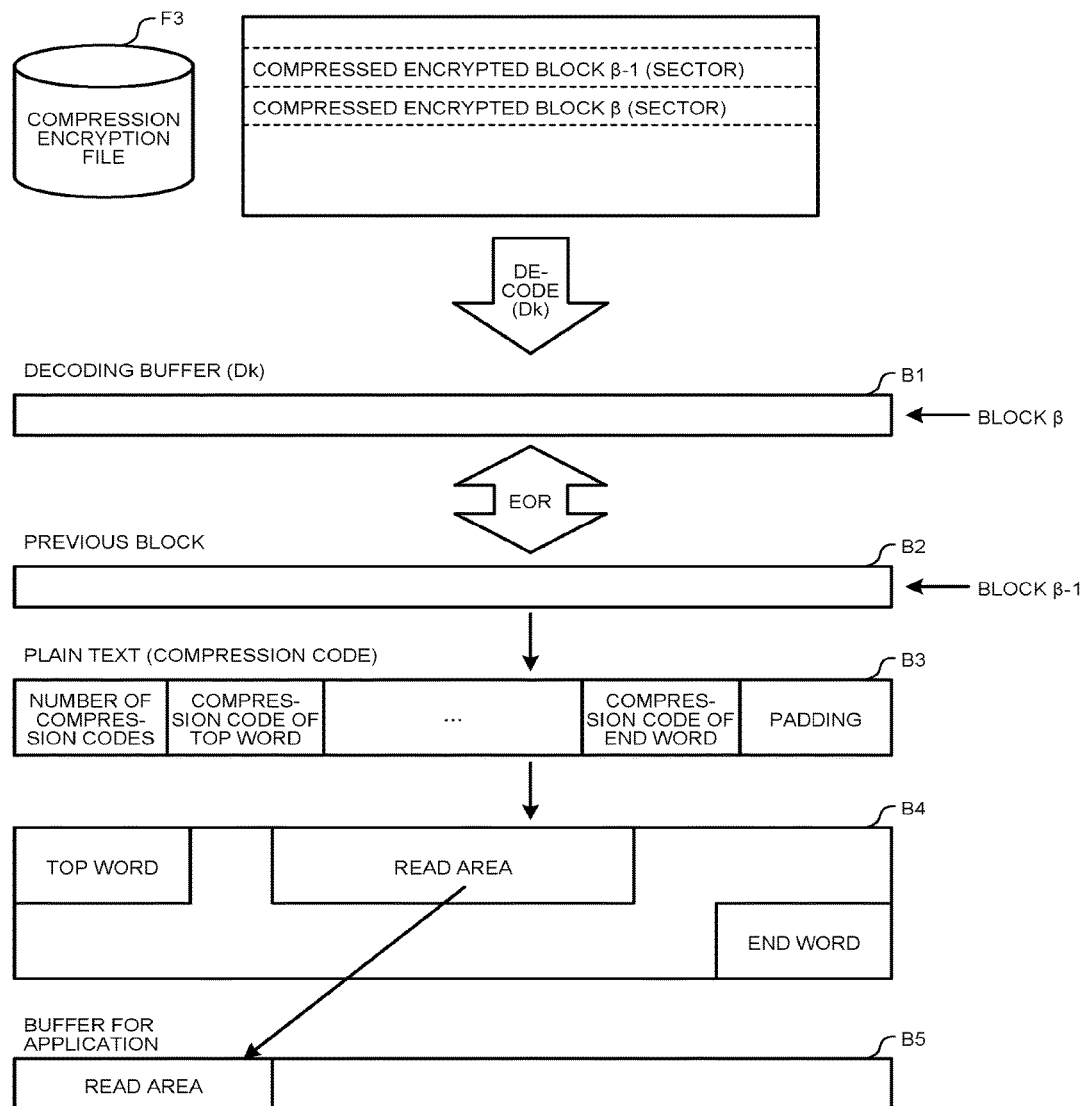
FIG. 8 is a schematic diagram illustrating an example of the flow of a partial decoding decompression process performed by an information processing apparatus according to the embodiment.

FIG. 8 is a schematic diagram illustrating an example of the flow of a partial decoding decompression process performed by an information processing apparatus according to the embodiment. As illustrated in FIG. 8, the information processing apparatus provides a storage area B1, a storage area B2, and a storage area B3 in a memory as a work area of the partial decoding process. The information processing apparatus provides a storage area B4 in the memory as a work area of the partial decompression process. Furthermore, in FIG. 8, it is assumed that the information processing apparatus narrows down, by using the bitmap type index T3, a block β indicated by the target block ID as the decompression target.

The information processing apparatus reads the block β from the compression encryption file F3, performs an operation on the data in the block β by using the decoding function (Dk), decodes the block β, and stores the block β in the storage area B1. The storage area B1 is a decoding buffer (Dk). The information processing apparatus reads a block β-1 that is immediately previous to the block β from the compression encryption file F3 and stores the read block β-1 in the storage area B2. The block β-1 is a block needed to decode the block β. Then, the information processing apparatus performs an EOR operation between the data in the decoded block β stored in the storage area B1 and the data in the block β-1 that is stored in the storage area B2 and that has been subjected to compression encryption and then stores the EOR operation result in the storage area B3. Namely, the information processing apparatus decodes the block β that has been subjected to the compression encryption and creates a plain text including the number of compression codes, the compression codes, and the padding.

Then, the information processing apparatus sequentially reads the compression codes from the decoded plain text. The information processing apparatus refers to, based on the read compression code, the decompression dictionary associated with the dynamic dictionary or the static dictionary and creates decompression data. In this way, the information processing apparatus sequentially decompresses the compression codes included in the block β and stores the decompressed decompression data in the storage area B4.

Then, the information processing apparatus checks the decompression data that is stored in the storage area B4 against the input character string that is instructed to read and outputs the matched read area to the buffer B5 used for an application.

Figure 9:
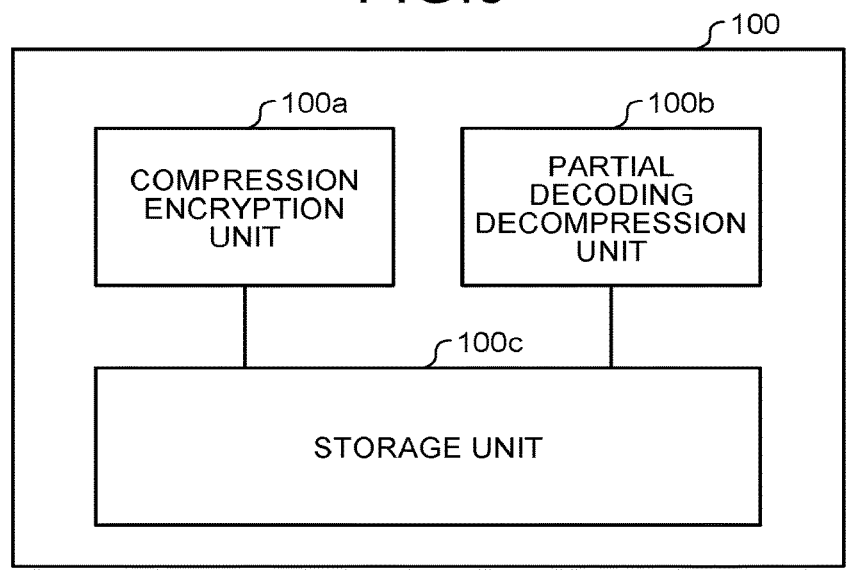
FIG. 9 is a functional block diagram illustrating an example of the configuration of the information processing apparatus according to the embodiment.

FIG. 9 is a functional block diagram illustrating an example of the configuration of the information processing apparatus according to the embodiment. As illustrated in FIG. 9, an information processing apparatus 100 includes a compression encryption unit 100a, a partial decoding decompression unit 100b, and a storage unit 100c.

The compression encryption unit 100a is a processing unit that performs the encoding process illustrated in FIGS. 1, 3, and 4. The partial decoding decompression unit 100b is a processing unit that performs the partial decoding decompression process illustrated in FIGS. 6, 7, and 8. The storage unit 100c stores therein the source file F1 that is targeted for the compression encryption, the compression file F2 that is obtained from the compression process, the compression encryption file F3 that is obtained by encrypting the compression file F2, or the like.

Furthermore, the information processing apparatus 100 sets, in the storage unit 100c, the storage areas A1, A2, A3, A4, A5, A6, and A7 illustrated in FIGS. 3 and 4. The information processing apparatus 100 sets, in the storage unit 100c, the storage areas B1, B2, B3, B4, and B5 illustrated in FIGS. 6, 7, 8, or the like.

Figure 10:
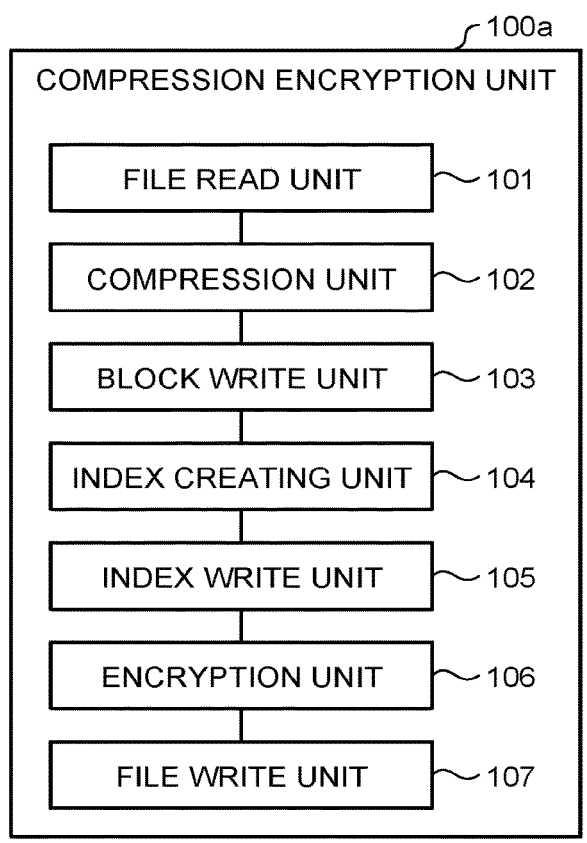
FIG. 10 is a functional block diagram illustrating an example of the configuration of a compression encryption unit according to the embodiment.

FIG. 10 is a functional block diagram illustrating an example of the configuration of a compression encryption unit according to the embodiment. As illustrated in FIG. 10, the compression encryption unit 100a includes a file read unit 101, a compression unit 102, a block write unit 103, an index creating unit 104, an index write unit 105, an encryption unit 106, and a file write unit 107.

The file read unit 101 is a processing unit that reads data of the content portion in the source file F1 that is obtained from combining a plurality of files. The file read unit 101 sequentially reads the files included in the source file F1. The file read unit 101 extracts the words included in the read files and sequentially outputs the extracted words to the compression unit 102. For example, if the file in the source file F1 is the first file and the second file, the file read unit 101 reads the files in the order of the first file and the second file. Then, if the pieces of data of the content portion in the read first file are a word α1 and a word α2, the file read unit 101 outputs each of the words to the compression unit 102 in the order of the word α1 and the word α2.

The compression unit 102 is a processing unit that compresses a word. The compression unit 102 refers to the static dictionary or the dynamic dictionary and encodes the word output from the file read unit 101. For example, the compression unit 102 compares the character string of the word with the bit filter and then determines whether the character string of the word is hit in a bit filter. The bit filter is a filter that specifies the character string of the word compressed by using the static dictionary. If the character string of the word is hit in the bit filter, the compression unit 102 encodes the character string of the word based on the static dictionary. If the character string of the word is not hit in the bit filter, the compression unit 102 encodes the character string of the word based on the dynamic dictionary. Then, the compression unit 102 outputs the encoded compression code to the block write unit 103.

The block write unit 103 is a processing unit that stores a compression code in a block with a fixed length. The block write unit 103 determines whether a block length exceeds when a compression code is temporarily written in the storage area A2. If a block length does not exceed when a compression code is temporarily written in the storage area A2, the block write unit 103 writes the subject compression code in the storage area A2. Then, the block write unit 103 outputs the compression code and the current block ID to the index creating unit 104.

If a block length does not exceed when a compression code is temporarily written in the storage area A2, the block write unit 103 does not write the subject compression code in the storage area A2. The block write unit 103 writes the number of compression codes indicating the number of compression codes that have already written in the storage area A2 into the top in the storage area A2. The block write unit 103 complements the rest of the area in the storage area A2 by using a padding. The block write unit 103 writes the block stored in the storage area A2 into the storage area A3 as a compressed block. The block write unit 103 adds, to the block address table T2, the position in the storage area A3 and the block ID of the compressed block actually written into the storage area A3. Then, after having processed the word at the end in the file, the block write unit 103 adds the information related to the file to the file address table T1. Namely, the block write unit 103 adds, to the file address table T1, the top position in the file in the storage area A3 and the pointer to the block address table T2 that is associated with the subject file.

The block write unit 103 writes, into the initialized storage area A2, the compression code that is determined to exceed the block length if the compression code is written in the storage area A2. Namely, the block write unit 103 writes the compression code into the storage area A2 as the process of the subsequent block. Then, the block write unit 103 outputs the compression code and the current block ID to the index creating unit 104. Furthermore, the block ID of the current block is, for example, "1" as a default value and, if a block is written in the storage area A3, the value becomes a value incremented by 1.

The index creating unit 104 creates, regarding the encoded compression code, the bitmap type index T3 associated with the current block ID. For example, the index creating unit 104 sets "1" to the bit at the position, in the bitmap type index T3, in which the column of the current block ID intersects with the row of the encoded compression code.

The index write unit 105 is a processing unit that stores, in the trailer unit in the compression file F2, the bitmap type index T3. After the completion of the compression process performed on the data in the source file F1, the index write unit 105 stores, in the trailer unit in the compression file F2, the bitmap type index T3. Then, the index write unit 105 stores, in the header unit in the compression file F2, the pointer to the bitmap type index T3 stored in the trailer unit. In addition, the index write unit 105 stores, in the trailer unit in the compression file F2, the file address table T1 and the block address table T2. Then, the index write unit 105 stores, in the header unit in the compression file F2, the pointer to each of the file address table T1 and the block address table T2 stored in the trailer unit.

The encryption unit 106 is a processing unit that encrypts a block. The encryption unit 106 extracts a block in the compression file F2 from the top and encrypts the extracted block. For example, if the encryption unit 106 extracts the top block, the encryption unit 106 performs an EOR operation between the data in the top block that has been subjected to compression encoding and the initial value IV and stores the EOR operation result in the storage area A6. If the encryption unit 106 extracts the block subsequent to the top block, the encryption unit 106 performs an EOR operation between the data in the block subjected to the compression encoding and the data in the immediately previous encrypted block and stores the EOR operation result in the storage area A6. The encryption unit 106 performs an operation of the EOR operation result by using the affine encryption function (Ek) and stores the obtained block in the storage area A7 as the compressed encrypted block. The encryption unit 106 outputs the data in the compressed encrypted block stored in the storage area A7 to the file write unit 107. Furthermore, the encryption unit 106 encrypts the compressed data and the trailer unit in the compression file F2.

The file write unit 107 is a processing unit that acquires a compressed encrypted block from the encryption unit 106 and that writes the acquired compressed encrypted block in the compression encryption file F3.

Figure 11:
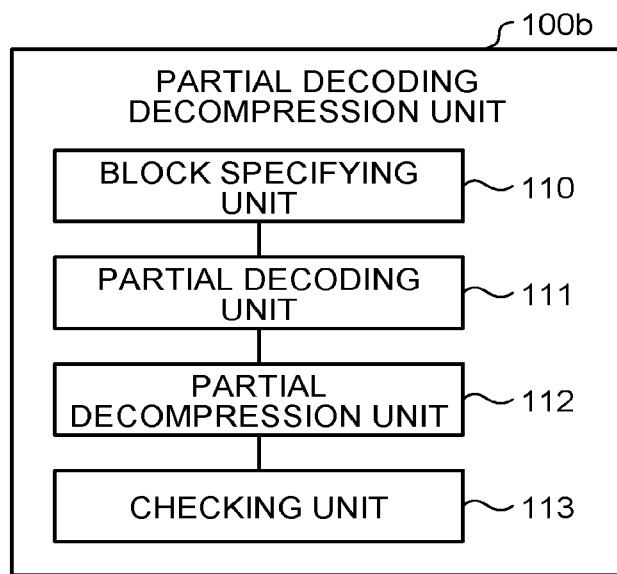
FIG. 11 is a functional block diagram illustrating an example of the configuration of a partial decoding decompression unit according to the embodiment.

FIG. 11 is a functional block diagram illustrating an example of the configuration of a partial decoding decompression unit according to the embodiment. As illustrated in FIG. 11, the partial decoding decompression unit 100b includes a block specifying unit 110, a partial decoding unit 111, a partial decompression unit 112, and a checking unit 113.

The block specifying unit 110 is a processing unit that specifies a compressed encrypted block that is stored in the compression encryption file F3 and that is subjected to partial decoding decompression.

When the block specifying unit 110 acquires an instruction to read a specified input character string, the block specifying unit 110 decodes the bitmap type index T3. For example, the block specifying unit 110 decodes the block at the position indicated by the pointer, which is stored in the header unit in the compression file F2, to the bitmap type index T3. In addition, the block specifying unit 110 decodes the file address table T1 and the block address table T2. The block specifying unit 110 decodes the dynamic dictionary T4.

The block specifying unit 110 performs morphological analysis on an input character string. The morphological analysis means that an input character string is divided into words. If the number of words forming an input character string is singular, the block specifying unit 110 specifies, by using the bitmap type index T3, the block ID indicating that the bitmap associated with the compression code indicated by the word is "1". If the number of words constructing an input character string is plural, the block specifying unit 110 specifies, by using the bitmap type index T3, all of the block IDs indicating that each of the bitmaps associated with the compression codes indicated by a plurality of words are "1". Then, the block specifying unit 110 outputs the specified block ID to the partial decoding unit 111.

The partial decoding unit 111 is a processing unit that decodes the block (compressed encrypted block) with the block ID specified as the decompression target. The partial decoding unit 111 refers to the block address table T2 and reads, from the compression encryption file F3, the compressed encrypted block with the block ID specified as the decompression target. The partial decoding unit 111 reads, from the compression encryption file F3, the compressed encrypted block with the block ID that is immediately previous to the block ID that is specified as the decompression target. The partial decoding unit 111 performs an operation, by using the decoding function (Dk), on the data in the compressed encrypted block with the block ID that is specified as the decompression target. The partial decoding unit 111 stores the operation result in the storage area B1. The partial decoding unit 111 stores, in the storage area B2, the data in the compressed encrypted block that is immediately previous to the block ID that is specified as the decompression target. The partial decoding unit 111 performs an EOR operation between the data stored in the storage area B1 and the data stored in the storage area B2 and stores the EOR operation result in the storage area B3. Consequently, the partial decoding unit 111 creates, regarding the compressed encrypted block with the block ID specified as the decompression target, a compressed block that includes therein the number of compression codes, a compression code, and the padding. The partial decoding unit 111 outputs the compressed block to the partial decompression unit 112.

The partial decompression unit 112 is a processing unit that decompresses the decoded compressed block. The partial decompression unit 112 decompresses the compression code in the decompression form associated with the compression form compressed by the compression unit 102. For example, the partial decompression unit 112 reads the compression code in the decoded compressed block from the top and decompresses the read compression code by using a decompression dictionary associated with the dynamic dictionary or the static dictionary. The partial decompression unit 112 stores the decompressed decompression data in the storage area B4.

The checking unit 113 checks the decompression data against the input character string that is instructed to be read. For example, the checking unit 113 checks the decompression data stored in the storage area B4 against the input character string that is instructed to be read and then outputs the data in the matched area. When the checking unit 113 outputs the data in the matched area, the checking unit 113 may also output the block ID specified by the block specifying unit 110 or may also output the identification number of the file that includes the block with the subject block ID.

Figure 12A:
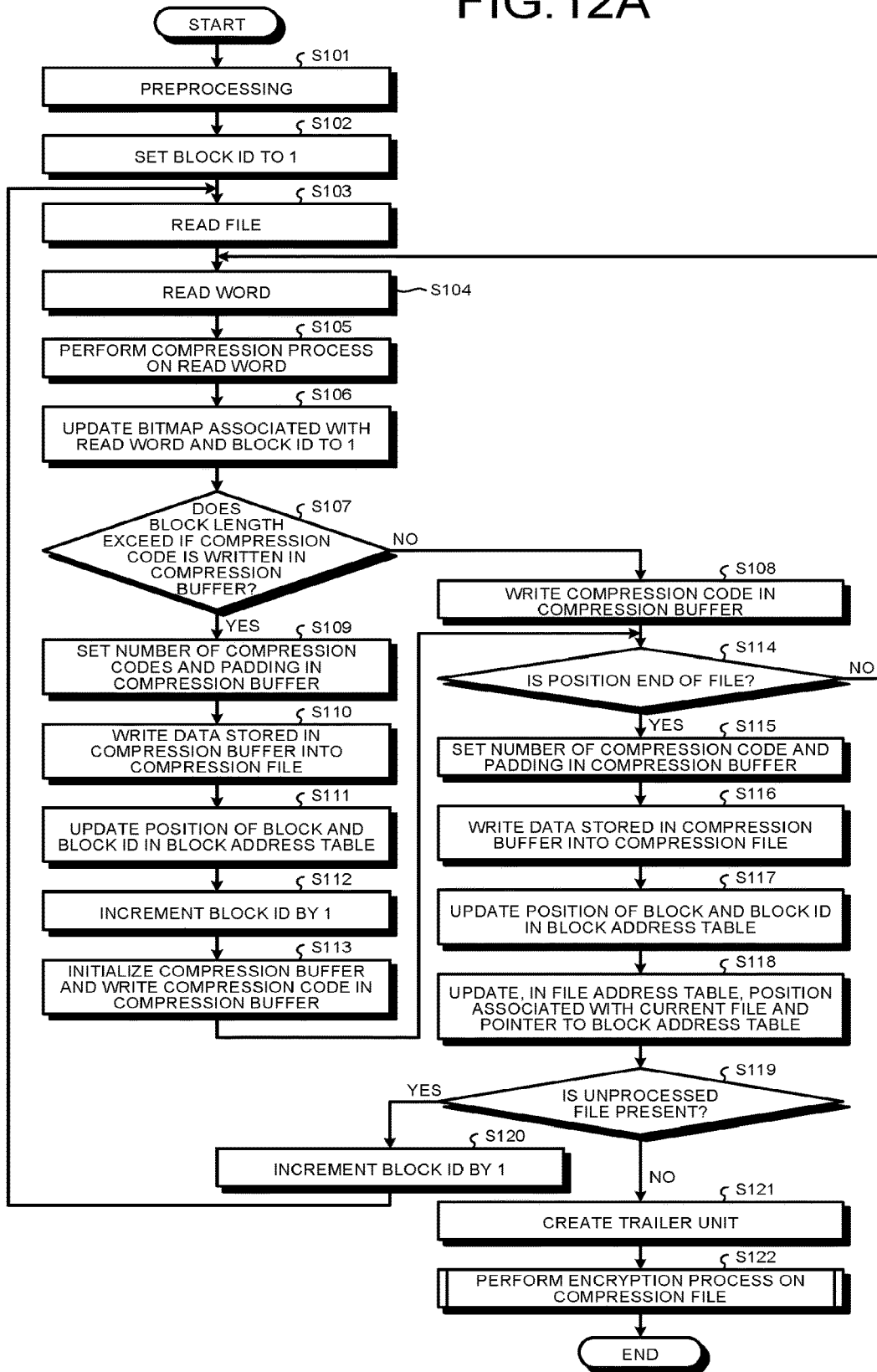
FIG. 12A is a flowchart (1) illustrating the flow of a process performed by the compression encryption unit according to the embodiment.
Figure 12B:
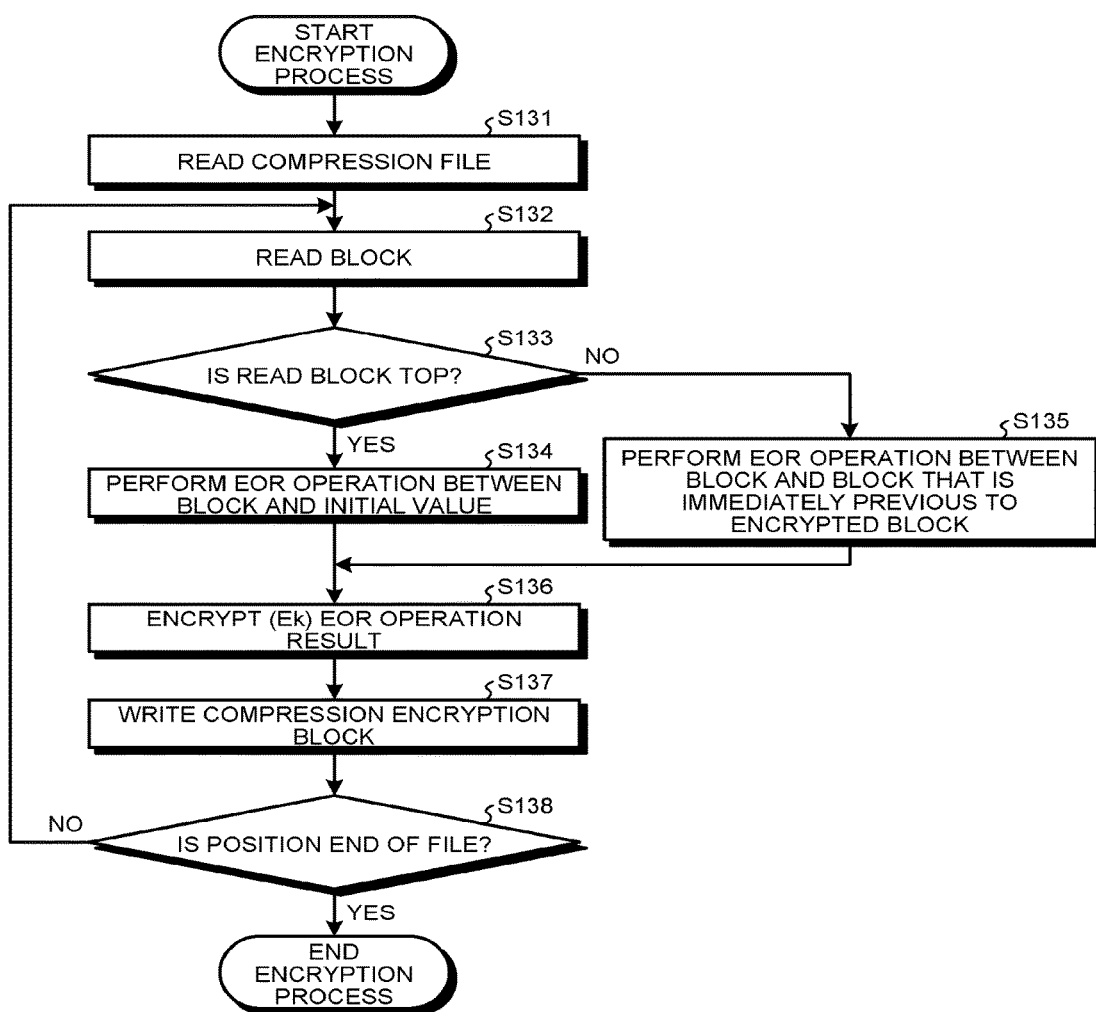
FIG. 12B is a flowchart (2) illustrating the flow of a process performed by the compression encryption unit according to the embodiment.

In the following, the flow of the process performed by the compression encryption unit 100a will be described with reference to FIGS. 12A and 12B. FIG. 12A and FIG. 12B are flowcharts each illustrating the flow of a process performed by the compression encryption unit according to the embodiment.

As illustrated in FIG. 12A, the compression encryption unit 100a performs preprocessing (Step S101). In the preprocessing at Step S101, the compression encryption unit 100a reserves, for example, the storage areas A1 to A7 in the storage unit 100c.

The compression encryption unit 100a sets the block ID to 1 that is a default value (Step S102). The compression encryption unit 100a reads a single file into the storage area A1 from the source file F1 that is targeted for compression encryption and that is obtained by combining a plurality of files (Step S103) and reads the word (Step S104). The compression encryption unit 100a executes the compression process of the read word (Step S105). Regarding the bitmap type index T3, the compression encryption unit 100a updates both the compression code that is indicated by the read word and the bitmap that is associated with the set block ID to 1 (Step S106). As an example, it is assumed that the block ID is 1 and the word is the word a1. In this case, the compression encryption unit 100a sets the bit at the position in which the column that indicates that the block ID is 1 intersects with the row that indicates that the compression code is word a1 to 1.

The compression encryption unit 100a determines whether the block length exceeds if the compression code is written in the compression buffer A2 (Step S107). If the compression encryption unit 100a determines that the block length does not exceed if the compression code is written in the compression buffer A2 (No at Step S107), the compression encryption unit 100a writes the compression code in the compression buffer A2 (Step S108). Then, the compression encryption unit 100a proceeds to Step S114.

In contrast, if the compression encryption unit 100a determines that the block length exceeds if the compression code is written in the compression buffer A2 (Yes at Step S107), the compression encryption unit 100a does not perform the process of writing the compression code into the compression buffer A2. Then, the compression encryption unit 100a sets the number of compression codes and a padding in the compression buffer A2 (Step S109). For example, the compression encryption unit 100a writes, into the top in the compression buffer, the number of compression codes that indicates the number of pieces of the compressed data that have already been written in the compression buffer A2. The compression encryption unit 100a complements the rest of the area in the compression buffer by using the padding. Consequently, data in the block is created in the compression buffer A2.

The compression encryption unit 100a writes the data stored in the compression buffer A2 into the compression file F2 (Step S110). For example, the compression encryption unit 100a writes the data stored in the compression buffer A2 into the storage area A3 as a compressed block. The storage area A3 is a storage area that indicates the compressed data in the compression file F2.

The compression encryption unit 100a updates both the position of the block indicated by the block ID and the block ID in the block address table T2 (Step S111). Namely, the compression encryption unit 100a adds, to the block address table T2, both the position of the compressed block that is stored in the storage area A3 and that is actually written in the storage area A3 and the block ID.

The compression encryption unit 100a adds 1 to the block ID (Step S112), initializes the compression buffer A2, and writes, into the compression buffer, the compression code that is not subjected to the process of writing (Step S113). Then, the compression encryption unit 100a proceeds to Step S114.

At Step S114, the compression encryption unit 100a determines whether the position is the end of the file (Step S114). If the position is not the end of the file (No at Step S114), the compression encryption unit 100a proceeds to Step S104 in order to read the subsequent word.

In contrast, if the position is the end of the file (Yes at Step S114), the compression encryption unit 100a sets the number of compression codes and a padding in the compression buffer A2 (Step S115). For example, the compression encryption unit 100a writes, at the top in the compression buffer, the number of compression codes indicating the number of pieces of the compressed data that have already been written in the compression buffer A2. The compression encryption unit 100a complements the rest of the area in the compression buffer by using the padding. Consequently, the data in the block is created in the compression buffer A2.

The compression encryption unit 100a writes the data stored in the compression buffer A2 into the compression file F2 (Step S116). For example, the compression encryption unit 100a writes, into the storage area A3, the data stored in the compression buffer A2 as the compressed block.

The compression encryption unit 100a updates both the position of the block indicated by the block ID and the block ID that are stored in the block address table T2 (Step S117). Namely, the compression encryption unit 100a adds, to the block address table T2, both the position of the compressed block that is stored in the storage area A3 and that is actually written in the storage area A3 and the block ID. Then, the compression encryption unit 100a updates the position that is associated with the current file and the pointer to the block address table T2 that are stored in the file address table T1 (Step S118). Namely, the compression encryption unit 100a adds the position of the top compressed block that is stored in the storage area A3 in the current file and the pointer to the block address table T2 in the current file.

The compression encryption unit 100a determines whether an unprocessed file is present (Step S119). If it is determined that an unprocessed file is present (Yes at Step S119), the compression encryption unit 100a increments the block ID by 1 (Step S120). Then, the compression encryption unit 100a proceeds to Step S103 in order to read the subsequent file.

In contrast, if it is determined that an unprocessed file is not present (No at Step S119), the compression encryption unit 100a creates a trailer unit in the compression file F2 (Step S121). For example, the compression encryption unit 100a stores the bitmap type index T3, the file address table T1, and the block address table T2 in the trailer unit in the compression file F2. Then, the compression encryption unit 100a sets the pointer to the trailer unit and the pointer to the compressed data in the header unit in the compression file F2. The pointer to the trailer unit includes therein the pointer to the bitmap type index T3, the pointer to the file address table T1, and the pointer to the block address table T2.

The compression encryption unit 100a performs an encryption process on the compression file F2 (Step S122) and ends the compression encryption process. Furthermore, the flow of the encryption process will be described later.

FIG. 12B is a flowchart illustrating the flow of the encryption process from among the processes performed by the compression encryption unit 100a. As illustrated in FIG. 12B, the compression encryption unit 100a reads the compression file F2 (Step S131) and reads the block (compressed block) (Step S132).

The compression encryption unit 100a determines whether the read block is the top (Step S133). If it is determined that the read block is the top (Yes at Step S133), the compression encryption unit 100a performs an EOR operation between the data in the subject block and the initial value IV (Step S134). In contrast, if it is determined that the read block is not the top (No at Step S133), the compression encryption unit 100a performs an EOR operation between the data in the subject block and the data in the block that is immediately previous to the encrypted block (Step S135).

Then, the compression encryption unit 100a performs an operation on the EOR operation result by using the affine encryption function (Ek) and performs encryption (Step S136). Consequently, the compression encryption unit 100a creates a block (compressed encrypted block) by encrypting the read block. Then, the compression encryption unit 100a writes the data in the compressed encrypted block into the compression encryption file F3 (Step S137).

The compression encryption unit 100a determines whether the position is the end of the compression file F2 (Step S138). If it is determined that the position is not the end of the compression file F2 (No at Step S138), the compression encryption unit 100a proceeds to Step S132 in order to read the subsequent block. If it is determined that the position is the end of the compression file F2 (Yes at Step S138), the compression encryption unit 100a ends the encryption process.

Figure 13:
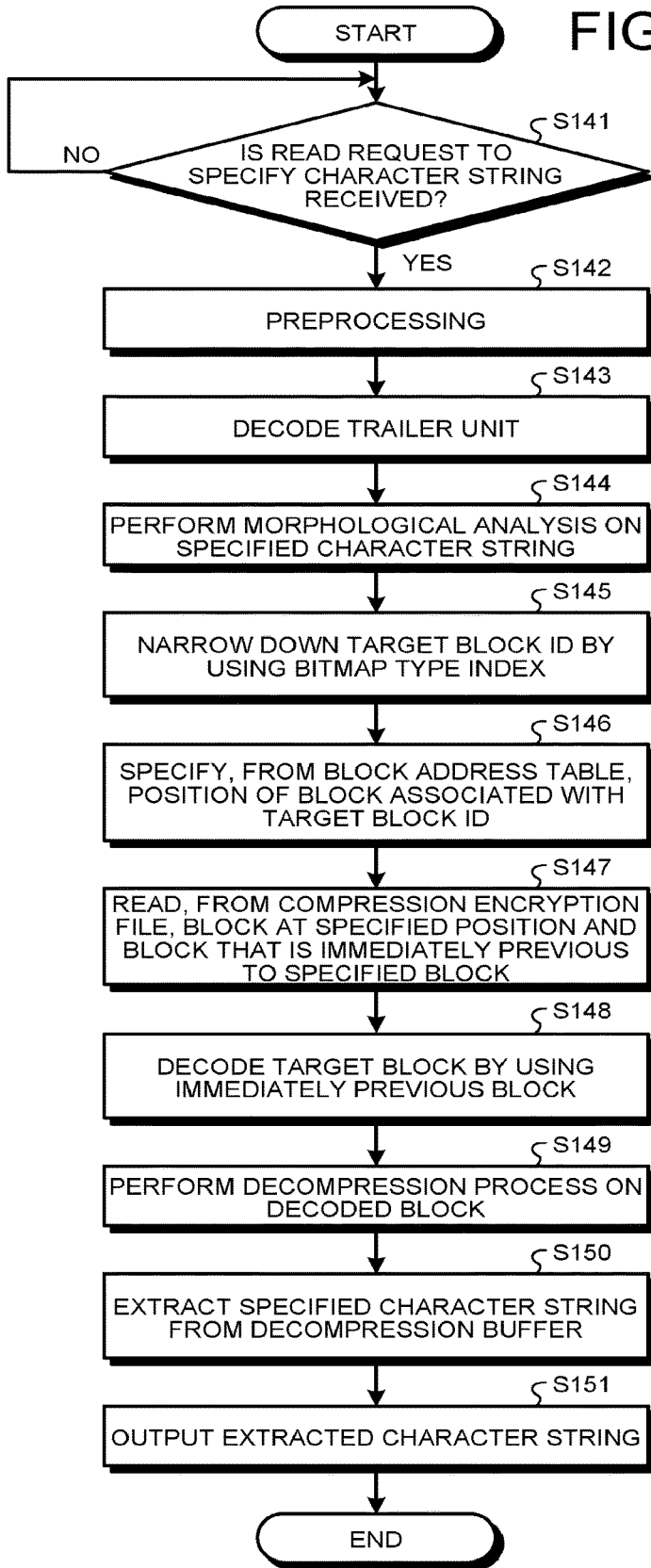
FIG. 13 is a flowchart illustrating the flow of a process performed by the partial decoding decompression unit according to the embodiment.

FIG. 13 is a flowchart illustrating the flow of a process performed by the partial decoding decompression unit according to the embodiment. As illustrated in FIG. 13, the partial decoding decompression unit 100b determines whether a read (read out) request to specify a character string is received (Step S141). If a read request is not received (No at Step S141), the partial decoding decompression unit 100b repeats the determination process until the partial decoding decompression unit 100b receives the read request.

In contrast, if a read request is received (Yes at Step S141), the partial decoding decompression unit 100b performs preprocessing (Step S142). In the preprocessing at Step S142, the partial decoding decompression unit 100b reserves, for example, the storage areas B1 to B5 in the storage unit 100c.

The partial decoding decompression unit 100b decodes the trailer unit (Step S143). For example, the partial decoding decompression unit 100b decodes the block at the position indicated by the pointer, which is stored in the header unit, to the bitmap type index T3. The partial decoding decompression unit 100b decodes the block at the position indicated by the pointer, which is stored in the header unit, to the file address table T1. The partial decoding decompression unit 100b decodes the block at the position indicated by the pointer to the block address table T2 stored in the header unit.

The partial decoding decompression unit 100b performs morphological analysis on the specified character string (Step S144). Namely, the partial decoding decompression unit 100b divides the specified character string into words. Then, the partial decoding decompression unit 100b narrows down the target block IDs by using the bitmap type index T3 (Step S145). For example, the partial decoding decompression unit 100b specifies, as the target block IDs, the block IDs that indicate all of the bitmaps associated with the corresponding compression codes indicated by the words that form the specified character string indicate "1". Namely, the partial decoding decompression unit 100b specifies the block at the specified position as the decompression target.

The partial decoding decompression unit 100b specifies, from the block address table T2, the position of the block (compressed encrypted block) associated with the target block ID (Step S146). Namely, the partial decoding decompression unit 100b specifies the block (compressed encrypted block) indicated by the target block ID as the decompression target.

The partial decoding decompression unit 100b reads, from the compression encryption file F3, both the block at the specified position and the block that is immediately previous to the specified block (Step S147). The partial decoding decompression unit 100b decodes the block specified as the decompression target by using the immediately previous block (Step S148). Then, the partial decoding decompression unit 100b performs a decompression process on the decoded block (Step S149).

The partial decoding decompression unit 100b performs the decompression process on the decoded block (Step S149) and writes the result of the decompression process in the storage area B4 (a decompression buffer). The partial decoding decompression unit 100b extracts the specified character string from the decompression buffer (Step S150). For example, the partial decoding decompression unit 100b checks the decompression data stored in the storage area B4 against the specified character string and extracts the data in the matched area.

Then, the partial decoding decompression unit 100b outputs the extracted character string to the buffer B5 for the application (Step S151). Then, the partial decoding decompression unit 100b ends the partial decoding decompression process.

In the embodiment, the partial decoding decompression unit 100b performs morphological analysis on an input character string and narrows down, by using the bitmap type index T3 in the compression encryption file F3, all of the block IDs in which the compression codes of the words that form the input character string are present. The partial decoding decompression unit 100b reads the block (encrypted block) indicated by the narrowed down block ID from the compression encryption file F3, performs decoding, performs decompression, and then checks the decompressed decompression data against the input character string. Here, a plurality of input character strings may be present. In such a case, the partial decoding decompression unit 100b performs morphological analysis on each of the input character strings and narrows down the block IDs associated with the corresponding input character strings by using the bitmap type index T3 in the compression encryption file F3. Then, the partial decoding decompression unit 100b may also perform the checking process on each of the input character strings in a multithreaded manner. Namely, regarding a single input character string A, the partial decoding decompression unit 100b reads, from the compression encryption file F3, the block (encrypted block) indicated by the narrowed down block ID, performs decoding, performs decompression, and checks against the input character string. At the timing at which the checking process is performed after the input character string A has been decoded, the partial decoding decompression unit 100b reads, from the compression encryption file F3, the block (encrypted block) indicated by the block ID that is narrowed down for a subsequent input character string B. At the timing at which the checking process is performed after the input character string B has been decoded, the partial decoding decompression unit 100b reads, from the compression encryption file F3, the block (encrypted block) indicated by the narrowed down block ID for a subsequent input character string C. By using multithreading in this way, even if a plurality of input character strings is present, the partial decoding decompression unit 100b can reduce the time taken for the checking processes by performing the checking processes in parallel.

Furthermore, in the embodiment, the compression encryption unit 100a performs a compression process and an encryption process. However, the partial decoding decompression unit 100b is not limited to this and may also perform a compression process that does not include the encryption process. In such a case, the partial decoding decompression unit 100b sequentially encodes a plurality of files by using a specific encoding format, divides the encoded data that is obtained by combining the pieces of encoded data into a plurality of blocks, creates the bitmap type index T3 with respect to each of the plurality of the divided blocks, and creates the compression file F2. Then, by using the bitmap type index T3 in the compression file F2, the partial decoding decompression unit 100b performs morphological analysis on the input character string and narrows down the block ID in which all of the words forming the input character string are present. The partial decoding decompression unit 100b decompresses the block (compressed block) indicated by the narrowed down block ID and checks the decompressed decompression data against the input character string.

In the following, the effect of the information processing apparatus 100 according to the embodiment will be described. The information processing apparatus 100 creates a plurality of pieces of encoded data by encoding a plurality of files by using a specific encoding format. The information processing apparatus 100 creates a plurality of encoded blocks by dividing combined encoded data, which is obtained by combining the plurality of pieces of the encoded data, into blocks with a fixed length. The information processing apparatus 100 creates each of indices associated with the plurality of the encoded blocks. Thus, when the information processing apparatus 100 searches the encoded data obtained by commonly encoding and combining the plurality of the files for a character string, the information processing apparatus 100 can decompress and check, by using the index created for each block, the block that is targeted for a search and consequently perform the checking at a high speed.

Furthermore, the information processing apparatus 100 according to the embodiment creates, regarding the plurality of the encoded blocks, an index indicating the information that indicates whether each of elements that are used in the specific encoding format is present. Thus, by creating the index for each block, the information processing apparatus 100 can prevent the efficiency of the index from being decreased in accordance with the file size when compared with a case in which an index is created for each file.

Furthermore, the information processing apparatus 100 according to the embodiment creates association information in which the position of each of the top codes in the plurality of the divided blocks with a fixed length in the encoded data is associated with the identifiers that are associated with the corresponding blocks. The information processing apparatus 100 creates an index of each of the identifiers that are associated with the plurality of the blocks. Thus, if the information processing apparatus 100 specifies the identifier associated with a predetermined block from the created index, the information processing apparatus 100 can identify, at a high speed, the block that is associated with the specified identifier by using the association information. Consequently, the information processing apparatus 100 can decompress the block at a high speed.

Furthermore, the information processing apparatus 100 according to the embodiment creates trailer information that includes therein information related to encoding of each of the indices, the association information, and the plurality of the files. Thus, the information processing apparatus 100 can decode the encoded data by using the trailer information and search for a character string.

Furthermore, the information processing apparatus 100 according to the embodiment allows the size of a block to be matched with the size of the block in the storage device that stores therein data or allows the size of a block to be an integral multiple. Thus, the information processing apparatus 100 can read the data related to the block at a high speed.

Figure 14:
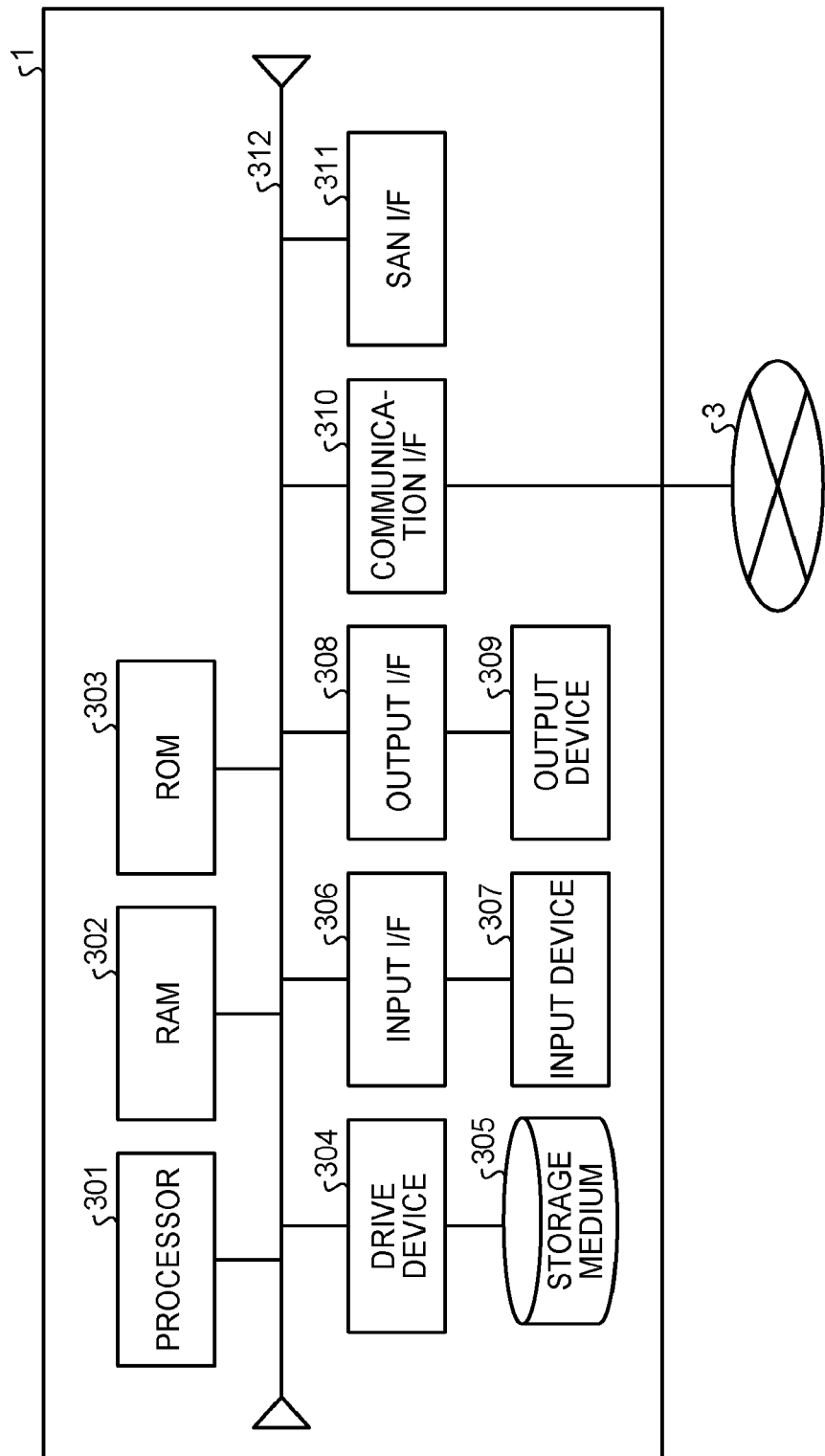
FIG. 14 is a schematic diagram illustrating an example of the hardware configuration of a computer.

In the following, hardware and software that are used in the embodiment will be described. FIG. 14 is a schematic diagram illustrating an example of the hardware configuration of a computer. A computer 1 includes, for example, a processor 301, a random access memory (RAM) 302, a read only memory (ROM) 303, a drive device 304, a storage medium 305, an input interface (I/F) 306, an input device 307, an output interface (I/F) 308, an output device 309, a communication interface (I/F) 310, a storage area network (SAN) interface (I/F) 311, a bus 312, and the like. The pieces of the hardware are connected via the bus 312.

The RAM 302 is a memory device that allows data items to be read and written. For example, a semiconductor memory, such as a static RAM (SRAM), a dynamic RAM (DRAM), or the like, is used or, instead of a RAM, a flash memory or the like is used. The ROM 303 also includes a programmable ROM (PROM) or the like. The drive device 304 is a device that performs at least one of the reading and writing of information recorded in the storage medium 305. The storage medium 305 stores therein information that is written by the drive device 304. The storage medium 305 is, for example, a flash memory, such as a hard disk, a solid state drive (SSD), or the like, or a storage medium, such as a compact disc (CD), a digital versatile disc (DVD), a blue-ray disk, or the like. Furthermore, for example, regarding the plurality types of storage media, the computer 1 provides the drive device 304 and the storage medium 305.

The input interface 306 is a circuit that is connected to the input device 307 and that transmits the input signal received from the input device 307 to the processor 301. The output interface 308 is a circuit that is connected to the output device 309 and that allows the output device 309 to perform an output in accordance with an instruction from the processor 301. The communication interface 310 is a circuit that controls communication via a network 3. The communication interface 310 is, for example, a network interface card (NIC) or the like. The SAN interface 311 is a circuit that controls communication with a storage device connected to the computer 1 via the storage area network. The SAN interface 311 is, for example, a host bus adapter (HBA) or the like.

The input device 307 is a device that sends an input signal in accordance with an operation. The input device 307 is, for example, a keyboard; a key device, such as buttons attached to the main body of the computer 1; or a pointing device, such as a mouse, a touch panel, or the like. The output device 309 is a device that outputs information in accordance with the control of the computer 1. The output device 309 is, for example, an image output device (display device), such as a display or the like, or an audio output device, such as a speaker or the like. Furthermore, for example, an input-output device, such as a touch screen or the like, is used as the input device 307 and the output device 309. Furthermore, the input device 307 and the output device 309 may also be integrated with the computer 1 or may also be devices that are not included in the computer 1 and that are, for example, connected to the computer 1 from outside.

For example, the processor 301 reads a program stored in the ROM 303 or the storage medium 305 to the RAM 302 and performs, in accordance with the procedure of the read program, the process of the compression encryption unit 100a or the process of the partial decoding decompression unit 100b. At that time, the RAM 302 is used as a work area of the processor 301. The function of the storage unit 100c is implemented by the ROM 303 and the storage medium 305 storing program files (an application program 24, middleware 23, an OS 22, or the like, which will be described later) or data files (the source file F1, the compression file F2, the compression encryption file F3, or the like that are targeted for compression) and by the RAM 302 using as the work area of the processor 301. The program read by the processor 301 will be described with reference to FIG. 15.

Figure 15:
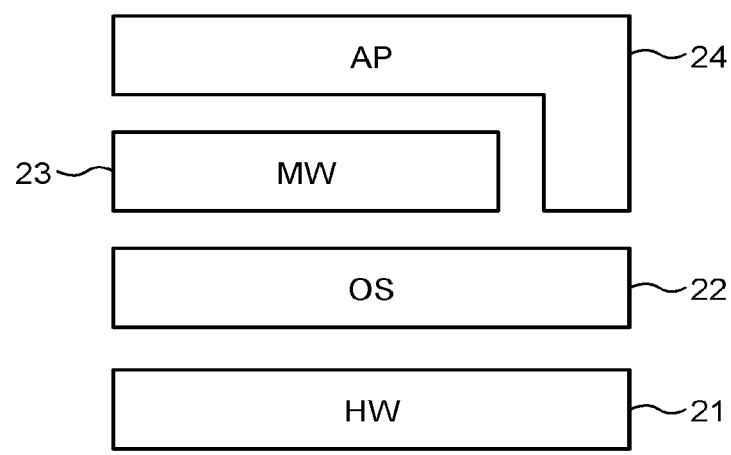
FIG. 15 is a schematic diagram illustrating a configuration example of a program operated by the computer.

FIG. 15 is a schematic diagram illustrating a configuration example of a program operated by the computer. In the computer 1, the operating system (OS) 22 that controls a hardware group 21 (301 to 312) illustrated in FIG. 15 is operated. The processes in accordance with the application program 24 or the middleware 23 are executed in the hardware group 21 by operating the processor 301 in accordance with the procedure of the OS 22 and by performing control and management of the hardware group 21. Furthermore, in the computer 1, the middleware 23 or the application program 24 is read in the RAM 302 and is executed by the processor 301.

If a compression encryption function is called, the processor 301 performs processes based on at least a part of the middleware 23 or the application program 24, whereby the function of the compression encryption unit 100a is implemented (by the processor 301 performing the processes by controlling the hardware group 21 based on the OS 22). Furthermore, if the partial decryption/decompression function is called, the processor 301 performs processes based on at least a part of the middleware 23 or the application program 24, whereby the function of the partial decoding decompressing unit 100b is implemented (by the processor 301 performing the processes by controlling the hardware group 21 based on the OS 22). The compression encryption function and the partial decryption/decompression function may also be included in the application program 24 itself or may be a part of the middleware 23 that is executed by being called in accordance with the application program 24.

Figure 16:
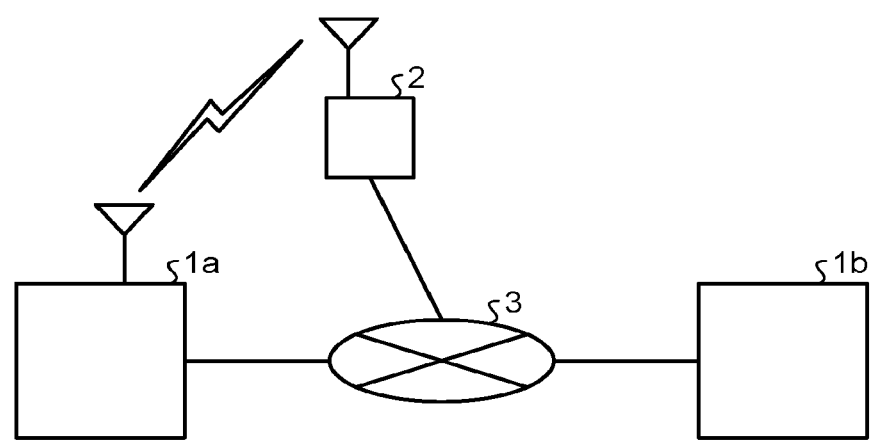
FIG. 16 is a schematic diagram illustrating a configuration example of a device in a system according to the embodiment.

FIG. 16 is a schematic diagram illustrating a configuration example of a device in a system according to the embodiment. The system illustrated in FIG. 16 includes a computer 1a, a computer 1b, a base station 2, and the network 3. The computer 1a is connected to the network 3 that is connected to the computer 1b by using wireless or wired connection.

The compression encryption unit 100a and the partial decoding decompression unit 100b illustrated in FIG. 9 may also be included in either the computer 1a or the computer 1b illustrated in FIG. 16. The computer 1b may also include the compression encryption unit 100a, whereas the computer 1a may also include the partial decoding decompression unit 100b. Alternatively, the computer 1a may also include the compression encryption unit 100a, whereas the computer 1b may also include the partial decoding decompression unit 100b. Furthermore, both the computer 1a and the computer 1b may also include the compression encryption unit 100a and the partial decoding decompression unit 100b.

In the following, a part of a modification of the above described embodiment will be described. In addition to the modification described below, design changes can be appropriately made without departing from the scope of the present invention. The target for the compression encryption process may also be, in addition to data in a file, monitoring messages or the like that are output from a system. For example, a process that compresses and encrypts the monitoring messages that are sequentially stored in a buffer by using the compression encryption process described above and that stores the compressed messages as log files is performed. Furthermore, for example, the compression and encryption may also be performed for each page in a database or may also be performed in units of multiple pages.

In the following, the data targeted for the compression encryption process described above is not limited to, as described above, character information. Information on only numeric values may also be used or, alternatively, the compression encryption process described above may also be used for data on image, voice, or the like. For example, in a file that contains a large amount of data obtained from speech synthesis or the like, because many repetitions are included in data, a compression ratio is expected to be improved from the dynamic dictionary. Of course, if a part of it is used, an excessive decompression process is reduced due to partial decoding decryption. Furthermore, regarding moving images captured by a fixed camera, because images of frames are similar, many repetitions are included. Thus, by using the compression encryption process described above, the same advantage as that of the document data or the voice data can be obtained.

According to an aspect of an embodiment, it is possible to perform a search at a high speed when a character string is searched in a file that is obtained by compressing and combining a plurality of files.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing therein an encoding program that causes a computer to execute a process comprising:
   first creating a plurality of pieces of encoded data that are obtained by encoding a plurality of files by using a specific encoding format;
   second creating a plurality of encoded blocks that are obtained by dividing combined encoded data, the combined encoded data being obtained by combining the plurality of pieces of the encoded data into blocks with a fixed length;

third creating, regarding each of the plurality of the encoded blocks, an index that indicates information indicating whether each of a plurality of elements used in the specific encoding format is present;
specifying, when an element formed by two or more characters is received, regarding each of the blocks, the block in which the received element is present based on the index;
decompressing encoded data in the specified block; and
checking decompressed decompression data against the received element.

2. The non-transitory computer-readable recording medium according to claim 1, wherein the process further includes forth creating association information in which the position of each of top codes in the plurality of the divided blocks in the encoded data is associated with identifiers associated with the corresponding blocks, wherein
the forth creating includes creating the index of each of the identifiers that are associated with the corresponding blocks.

3. The non-transitory computer-readable recording medium according to claim 2, wherein the process further includes fifth creating trailer information that includes information related to encoding of each of the indices, the association information, and the plurality of the files.

4. The non-transitory computer-readable recording medium according to claim 1, wherein the process further includes allowing the size of the blocks to be matched with the size of blocks in a storage device that stores data or allowing the size of the blocks to be an integral multiple.

5. The non-transitory computer-readable recording medium according to claim 1, wherein a unit of the plurality of the elements is a unit of words.

6. The non-transitory computer-readable recording medium according to claim 1, wherein a unit of the plurality of the elements is a unit of characters with an N gram (N is 2 or more).

7. An encoding device comprising:
a processor that executes a process including:
first creating a plurality of pieces of encoded data that are obtained by encoding a plurality of files by using a specific encoding format;
second creating a plurality of encoded blocks that are obtained by dividing combined encoded data, the combined encoded data being obtained by combining the plurality of pieces of the encoded data created at the first creating into blocks with a fixed length;
third creating, regarding each of the plurality of the encoded blocks, an index that indicates information indicating whether each of a plurality of elements used in the specific encoding format is present;
specifying, when an element formed by two or more characters is received, regarding each of blocks, the block in which the received element is present based on the index;
decompressing encoded data in the specified block; and
checking decompressed decompression data against the received element.

8. An encoding method comprising:
first creating a plurality of pieces of encoded data that are obtained by encoding a plurality of files by using a specific encoding format, by a processor;
second creating a plurality of encoded blocks that are obtained by dividing combined encoded data, the combined encoded data being obtained by combining the plurality of pieces of the encoded data into blocks with a fixed length, by the processor;
third creating, regarding each of the plurality of the encoded blocks, an index that indicates information indicating whether each of a plurality of elements used in the specific encoding format is present;
specifying, when an element formed by two or more characters is received, regarding each of blocks, the block in which the received element is present based on the index;
decompressing encoded data in the specified block; and
checking decompressed decompression data against the received element.

9. A non-transitory computer-readable recording medium storing therein a decoding program that causes a computer to execute a process comprising:
specifying, when an element formed by two or more characters is received, regarding each of blocks, a block in which the received element is present based on an index that indicates information indicating whether each of a plurality of elements is present;
decompressing encoded data in the specified block; and
checking decompressed decompression data against the received element.

10. A decoding device comprising:
a processor that executes a process including:
specifying, when an element formed by two or more characters is received, regarding each of blocks, a block in which the received element is present based on an index indicating information that indicates whether each of a plurality of elements is present;
decompressing encoded data in the block specified at the specifying; and
checking decompression data decompressed at the decompressing against the received element.

11. A decoding method comprising:
specifying, when an element formed by two or more characters is received, regarding each of blocks, a block in which the received element is present based on an index that indicates information indicating whether each of a plurality of elements is present, by a processor;
decompressing encoded data in the specified block, by the processor; and
checking decompressed decompression data against the received element, by the processor.

* * * * *